United States Patent
Trinh et al.

(10) Patent No.: US 8,711,553 B2
(45) Date of Patent: Apr. 29, 2014

(54) DISPLAY SYSTEM WITH MOUNTING ASSEMBLIES AND ASSOCIATED METHODS

(75) Inventors: Nick Quang Trinh, Minneapolis, MN (US); Joseph Harlan Bowser, Roseville, MN (US); Jim W. Kostka, Minnetonka, MN (US); Nicholas C. Juric, Rockford, IL (US)

(73) Assignee: Target Brands, Inc., Minneapolis, MN (US)

( * ) Notice: Subject to any disclaimer, the term of this patent is extended or adjusted under 35 U.S.C. 154(b) by 197 days.

(21) Appl. No.: 13/471,156

(22) Filed: May 14, 2012

(65) Prior Publication Data

US 2013/0301216 A1 Nov. 14, 2013

(51) Int. Cl.
*G06F 1/16* (2006.01)

(52) U.S. Cl.
USPC .................. 361/679.02; 248/206.5; 345/427; 312/245

(58) Field of Classification Search
USPC ............ 248/188, 125.7, 276.1, 205.1, 206.5; 348/825, 468, 240.99, 836; 361/679.01, 679.27, 679.02, 679.26, 361/679.21, 579.06, 679.4, 679.05, 679.43, 361/679.04, 679.28, 679.22, 679.59, 361/679.58, 679.55, 679.29, 679.07, 361/679.41; 345/157, 163, 102, 205, 426, 345/80, 427, 104; 312/223.1, 223.2, 223.3, 312/7.2, 245
See application file for complete search history.

(56) References Cited

U.S. PATENT DOCUMENTS

| | | | |
|---|---|---|---|
| 5,076,079 A | 12/1991 | Monoson et al. | |
| 5,595,074 A | 1/1997 | Munro | |
| 5,836,183 A | 11/1998 | Derman | |
| 6,216,499 B1 | 4/2001 | Ronberg et al. | |
| 6,237,375 B1 | 5/2001 | Wymer | |
| 6,308,928 B1 | 10/2001 | Galant | |
| 6,443,417 B2 | 9/2002 | Galant | |
| 6,700,488 B1 | 3/2004 | Leyden et al. | |
| 6,763,690 B2 | 7/2004 | Galant | |
| 7,007,912 B1 | 3/2006 | Giuliani et al. | |
| 7,032,872 B2 | 4/2006 | Sullivan | |
| 7,174,752 B2 | 2/2007 | Galant | |
| D540,566 S | 4/2007 | Scholen et al. | |
| 7,287,652 B2 | 10/2007 | Scholen et al. | |
| D564,220 S | 3/2008 | Dixon | |

(Continued)

OTHER PUBLICATIONS

Office Action from Canadian Patent Application No. 2,776,372, mailed Feb. 13, 2013 (4 pages).

(Continued)

*Primary Examiner* — Hung Duong
(74) *Attorney, Agent, or Firm* — Griffiths & Seaton PLLC; JoAnn M. Seaton

(57) ABSTRACT

A mounting fixture includes a box, a first arm, and a second arm. The box includes a primary panel, four sidewalls rearwardly extending from the primary panel, and a central hub rearwardly extending from a rear surface of the primary panel. The first arm extends beyond one of the four sidewalls, includes a first elongated slot, and has a first hook section at an outermost end thereof. The first elongated slot extends around and is slidably adjustable relative to the central hub to cause the first arm to extend further from or closer to the one of the four sidewalls. The second arm extends beyond a different one of the four sidewalls, includes a second elongated slot, and has a second hook section at an outermost end thereof. The second elongated slot extends around and is slidably adjustable relative to the central hub.

26 Claims, 28 Drawing Sheets

(56) References Cited

U.S. PATENT DOCUMENTS

| | | | |
|---|---|---|---|
| 7,443,665 B2 | 10/2008 | Allen | |
| 7,499,270 B2 | 3/2009 | Allen | |
| 7,607,621 B2 * | 10/2009 | Cai et al. | 248/188 |
| 7,611,119 B2 | 11/2009 | Rossini | |
| 7,654,399 B2 | 2/2010 | Scholen et al. | |
| 7,658,363 B2 | 2/2010 | Meyer | |
| 7,744,404 B1 | 6/2010 | Henson et al. | |
| 7,866,623 B2 | 1/2011 | Lampman et al. | |
| D634,315 S | 3/2011 | Nousiainen | |
| D637,593 S | 5/2011 | Zanetti | |
| D640,707 S | 6/2011 | Yeh | |
| D641,610 S | 7/2011 | Sedalo | |
| D653,668 S | 2/2012 | Song et al. | |
| D658,651 S | 5/2012 | Lee et al. | |
| D666,205 S | 8/2012 | Li et al. | |
| D669,481 S | 10/2012 | Prescott et al. | |
| D669,890 S | 10/2012 | Hopkins et al. | |
| D673,960 S | 1/2013 | Lindfield et al. | |
| D674,803 S | 1/2013 | Westrup | |
| D674,804 S | 1/2013 | Cote | |
| 2005/0161555 A1 | 7/2005 | Leitner et al. | |
| 2007/0252919 A1 * | 11/2007 | McGreevy | 348/825 |
| 2008/0192410 A1 | 8/2008 | Kumar | |
| 2010/0060532 A1 | 3/2010 | Kuang et al. | |
| 2010/0079285 A1 | 4/2010 | Fawcett et al. | |
| 2010/0096518 A1 * | 4/2010 | Wang et al. | 248/125.7 |
| 2010/0108828 A1 | 5/2010 | Yu et al. | |
| 2010/0326144 A1 | 12/2010 | Foster et al. | |
| 2011/0011812 A1 | 1/2011 | Johnson et al. | |
| 2011/0024371 A1 | 2/2011 | Lampman et al. | |
| 2011/0062294 A1 | 3/2011 | Johnson et al. | |
| 2011/0100073 A1 | 5/2011 | Johnston et al. | |
| 2011/0133050 A1 | 6/2011 | Eisenberger, Sr. et al. | |

OTHER PUBLICATIONS

"Expandable Laptop Security Bracket," printed from www.americantheftprevention.com/Computer-Laptop-Security/Expandable-Laptop-Bracket-p178.html on May 14, 2012 (2 pages).

"Tablet and Smartphone Merchandising Security & Power," printed from http://mti-interactive.com/categories-supported/?filter=term-15, 2012 (5 pages).

"MTI's Tether Technologies Improve Durability, Reduce False Alarms, and Extend Display Lifespan Over 4 Times That of Retractor-Based Systems," www.mti-interactive.com, publicly available more than one year prior to May 14, 2012 (9 pages).

"Freedom™ Core," www.mti-interactive.com, publicly available more than one year prior to May 14, 2012 (8 pages).

Office Action from Canadian Patent Application No. 2,776,372, mailed Jul. 17, 2013 (2 pages).

Office Action from Canadian Patent Application No. 2,776,372 mailed Sep. 20, 2012 (3 pages).

* cited by examiner

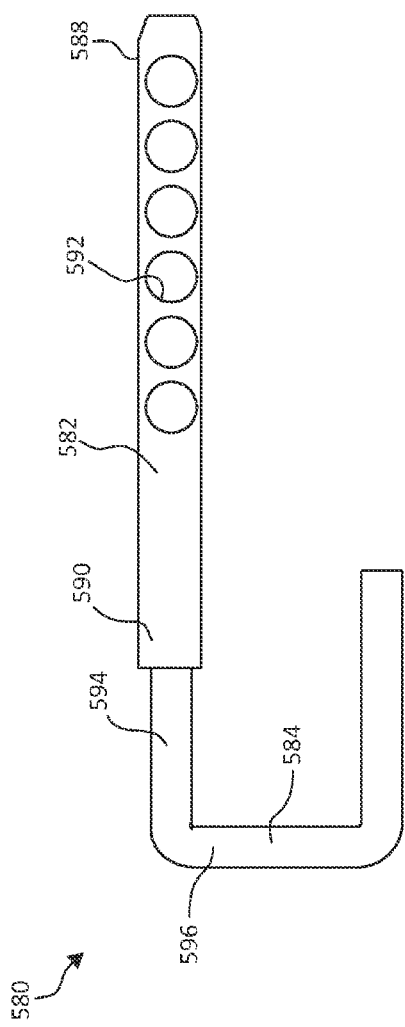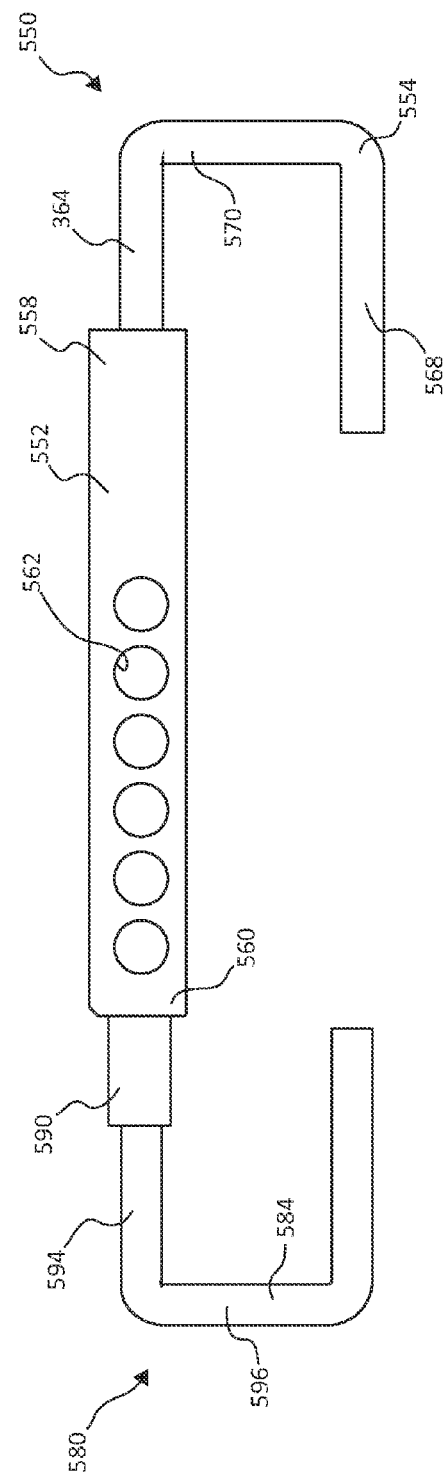
FIG. 33
FIG. 34

DISPLAY SYSTEM WITH MOUNTING ASSEMBLIES AND ASSOCIATED METHODS

BACKGROUND OF THE INVENTION

Display fixtures are often used in retail stores or other environments to present various products to consumers. For example, electronic devices can be displayed in stores to draw the interest of potential consumers. The display fixtures may provide the consumers with the opportunity to handle or use a number of sample devices before purchasing an electronic device in a factory or otherwise sealed package.

Some display fixtures are specifically designed to provide consumer access to a number of digital cameras or other electronic devices. Sample devices can be lifted from a display fixture so that consumers can handle and explore features. A security tether cable may be connected between each of the sample cameras and the display fixture so as to deter theft. If a sample camera is moved beyond a predetermined distance from the display fixture, the security tether cable can activate an audible alarm to alert store workers. The audible alarm may continue until a store worker arrives at the display fixture to deactivate the alarm.

In some examples, display fixtures are configured to retain cellular phones, personal digital assistants (PDAs), or other portable communication devices. The sample communication devices that are displayed at such a fixture may be arranged so that consumers can handle the device and inspect the user interface. In some circumstances, security tether cables are connected to the sample communication devices so as to deter theft. Here again, if a sample communication device is moved beyond a predetermined distance from the display fixture, the security tether cable can activate an audible alarm to alert store workers. The audible alarm may continue until a store worker arrives at the display fixture to deactivate the alarm.

SUMMARY OF THE INVENTION

One aspect of the present invention relates to a mounting fixture for securely displaying a computing device in a retail store, the mounting fixture includes a box, a first arm, and a second arm. The box includes a primary panel, four sidewalls rearwardly extending from the primary panel, and a central hub rearwardly extending from a rear surface of the primary panel. The first arm extends substantially perpendicularly to and beyond an outer surface of one of the four sidewalls. The first arm includes a first elongated slot and has a first hook section at an outermost end thereof configured to receive an outer edge of the computing device, and the first elongated slot extends around and is slidably adjustable in a first direction relative to the central hub of the box to cause the first arm to extend further from or closer to the one of the four sidewalls. The second arm extends substantially perpendicularly to and beyond an outer surface of a different one of the four sidewalls. The second arm includes a second elongated slot and has a second hook section at an outermost end thereof configured to receive a different outer edge of the computing device. The second elongated slot extends around and is slidably adjustable in a second direction relative to the central hub to cause the second arm to extend further from or closer to the different one of the four sidewalls. The first direction being substantially perpendicular to the first direction. Other apparatus, assemblies, and associated methods are also disclosed.

BRIEF DESCRIPTION OF THE DRAWINGS

Embodiments of the invention will be described with respect to the figures, in which like reference numerals denote like elements, and in which:

FIG. 33 is a top view illustration of a second laterally adjustable arm of the mounting fixture of FIG. 26, according to another embodiment of the present invention.

FIG. 34 is a top view illustration of the first laterally adjustable arm of FIG. 30 assembled with the second laterally adjustable arm of FIG. 33, according to another embodiment of the present invention.

DETAILED DESCRIPTION

The following detailed description of the invention merely provides example embodiments and is not intended to limit the invention or the application and uses of the invention. Furthermore, there is no intention to be bound by any theory presented in the preceding background of the invention or the following detailed description of the invention.

Retail sale of computing and other electronic devices is an extremely competitive industry. To increase retail sales of computing devices in a given retail environment, such as a retail store, it is desirable to display computing devices in an aesthetically pleasing and secure manner while still allowing a potential consumer to relatively freely interact with the computing device for their use in inspecting and selecting a desired computing device unit. In one example, mounting fixtures are used and are configured to adjust to hold various sized units of particular types of computing devices such that all devices of a given type are able to be supported by a similar mounting fixture regardless of size variations of the mounting fixtures, thereby creating an more cohesive overall retail display. In one embodiment, the mounting fixtures described herein securely hold the corresponding computing devices while leaving substantial portions of the edges of the corresponding computing devices exposed such that a potential consumer can readily get a feel for a thickness, finish, size, etc. of the corresponding computing device and/or interaction with the various control buttons/panels of the corresponding computing devices without need to remove the computing device from its corresponding mounting fixture.

Figure 1:
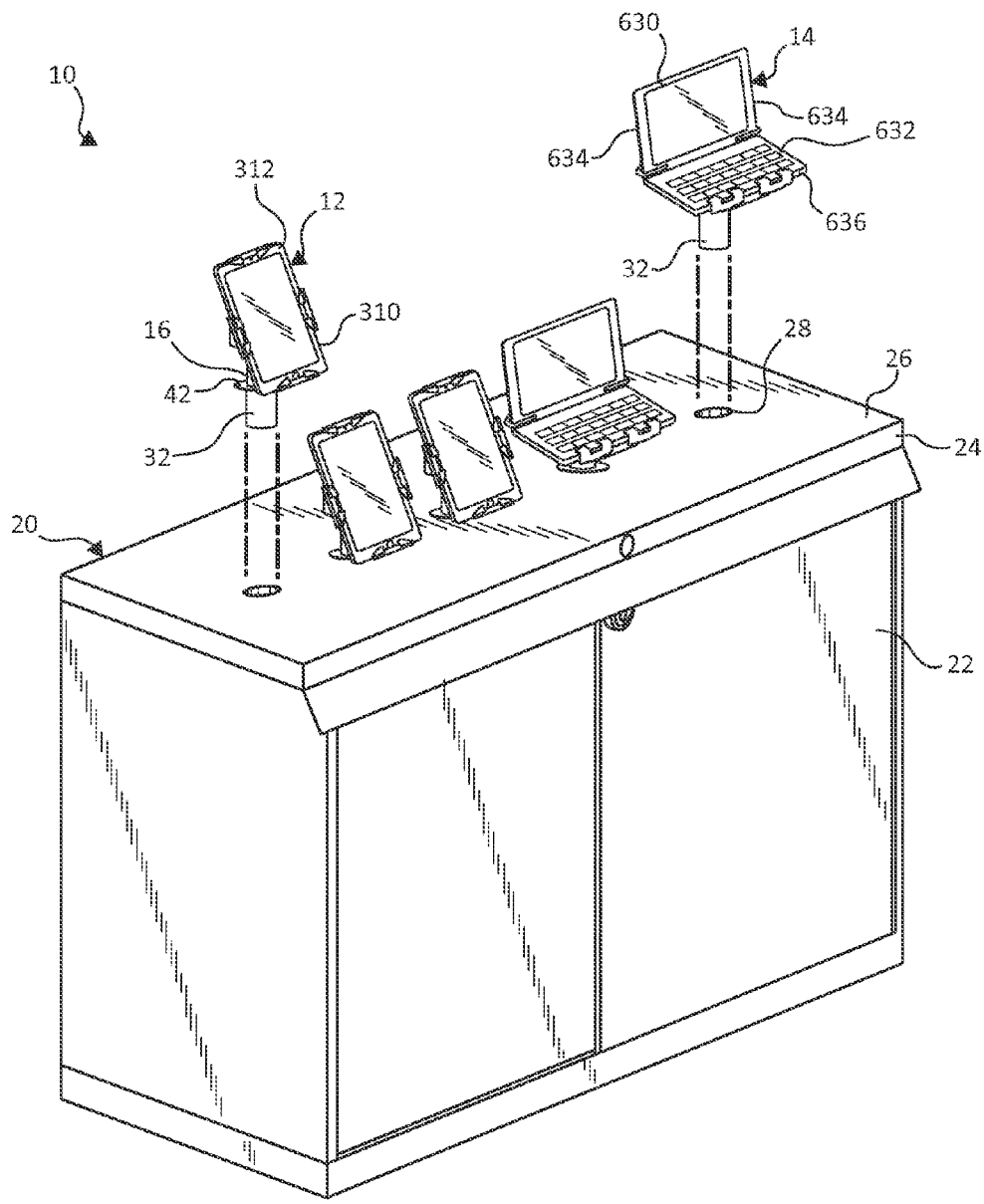
FIG. 1 is a partially exploded, front perspective view illustration of a display system, according to one embodiment of the present invention.

Turning to the figures, one embodiment of a display system is illustrated in FIG. 1 and is configured to support various types of computing devices such as, for instance, e-readers or computing tablets 12 (as used throughout this application, the term "computing tablets" is used to refer to all hand-held electronic devices of a generally flat nature as opposed to foldable netbooks and notebooks) and computing notebooks 14 such as laptops, netbooks and other hinged computing devices above a base 20 via mounting fixtures 16 and 18, respectively, according to one embodiment of the present invention.

Base 20 is a display unit extending upwardly from a floor in retail environment and includes a primary structure 22 and a hinged top 24. Hinged top 24 is configured to rotatably open and close to provide access to an inside of base 20, to cover electrical outlets for serving the electrical devices with electricity, etc. One example of base 20 can be found in U.S. patent application Ser. No. 12/561,458, filed Sep. 17, 2009, which is hereby incorporated by reference. In one embodiment, hinged top 24 defines a top display surface 26 and a plurality of apertures 28 leading to mounting tubes or sleeves 30 in base 20. Each mounting sleeve 30 is formed as a hollow tube and is configured to securely receive a lower portion of either mounting fixture 16 or mounting fixture 18. More particularly, in one embodiment, each mounting fixture 16 and 18 includes a mounting post or trunk 32 that is selectively received in a corresponding one of mounting sleeves 30, as will be further described below, and power and other cords can be run through mounting sleeves 30 to access a power source (not shown) in base 20.

Figure 2:
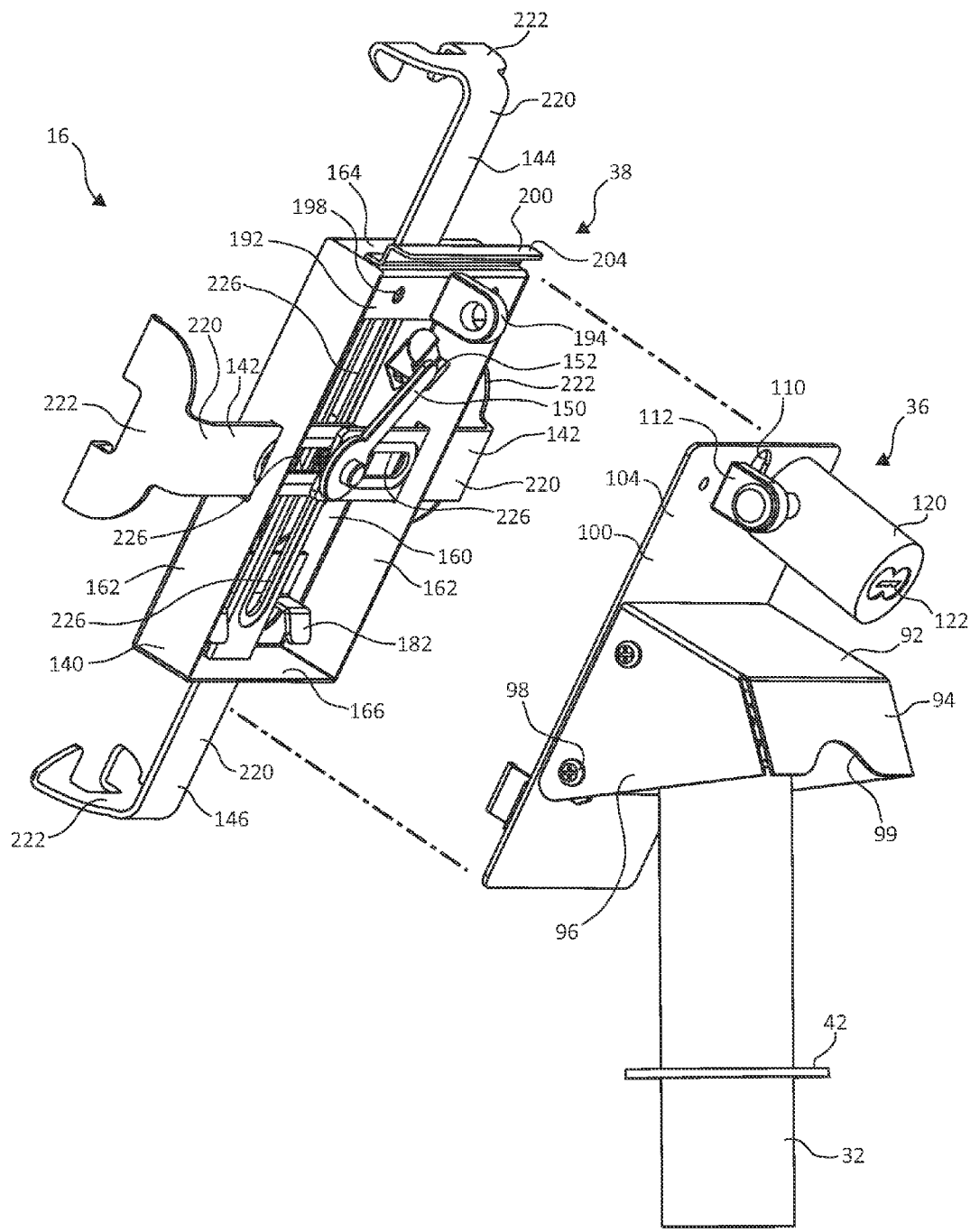
FIG. 2 is a partially exploded, rear perspective view illustration of a mounting fixture used in the display system of FIG. 1, according to one embodiment of the present invention.

FIG. 2 illustrates a partially exploded perspective view of mounting fixture 16 according to one embodiment. Mounting fixture 16 includes a trunk assembly 36 and a device securement assembly 38. Trunk assembly 36 includes mounting post or trunk 32 on one end and a mounting plate 100 on the other for securely receiving device securement assembly 38. More specifically, additionally referring to FIG. 3, trunk 32 is a hollow tube including an aperture 40, a cover plate 42, and a pivot plate 44, in one example. Aperture 40 is positioned near a bottom end of trunk 32 and is configured to receive a spring loaded pin (not shown) similar member for securing trunk 32 to mounting sleeve 30 of base 20 (FIG. 1). Cover plate 42, in one embodiment, is spaced upwardly from the bottom end of trunk 32 and extends radially outwardly from an outer surface of trunk 32 to effectively form a ring about trunk 32. Cover plate 42 is has a diameter at least equal to, and in one embodiment greater than, a diameter of at least corresponding ones of apertures 28 in base 20 for receiving trunk 32. As such, cover plate 42 is configured to sit on top display surface 26 and cover the corresponding one of apertures 28 that receives trunk 32.

Pivot plate 44 extends across a top end of trunk 32 opposite the bottom end of trunk 32. More specifically, in one example, pivot plate 44 is substantially planar and defines a first portion for substantially covering the top end of trunk 32 other than cutout 46, which provides access for electrical cords to pass into and through trunk 32. A front of the first portion of laterally extending portion 48 of pivot plate 44 extends substantially linearly across a front of pivot plate 44 and outwardly from either side of the first portion of pivot plate 44. At either end of laterally extending portion 48 of pivot plate 44, hinge flanges 50 extend upwardly with a substantially perpendicular orientation relative to laterally extending portion 48 of pivot plate 44. Each hinge flange 50 includes an aperture 52 substantially centered therein. In one embodiment, front stop plate 54 and rear stop plate 56, which, in one example, are formed together as a single piece, extend along and transversely across edges of each hinge flange 50 to form stops for articles at a front and a rear point, respectively, as will be further described below.

Pivot mount plate 60 is rotatably coupled to hinge flanges 50. Referring to FIGS. 3-6, pivot mount plate 60 includes a substantially planar or primary section 62, hinge flanges 68, and coupling flanges 70. More specifically, in one embodiment, pivot mount plate 60 is substantially rectangular and defines an aperture 64 substantially centered therethrough and a curvilinear or arced slot 66 extending through primary section 62. Arced slot 66 extends around aperture 64, which also represents a center point that arced slot 66 extends about with a consistent distance spacing or radius, in one example. Hinged flange 68 extends from a center of each side edge rearwardly from primary section 62, for example, with a substantially perpendicular orientation relative to primary section 62. Each coupling flange 70 also extends from one of side edges of primary section 62, and in one embodiment, one coupling flange 70 is formed on either side of a hinged flange 68 along a side edge of primary section 62.

Figure 3:
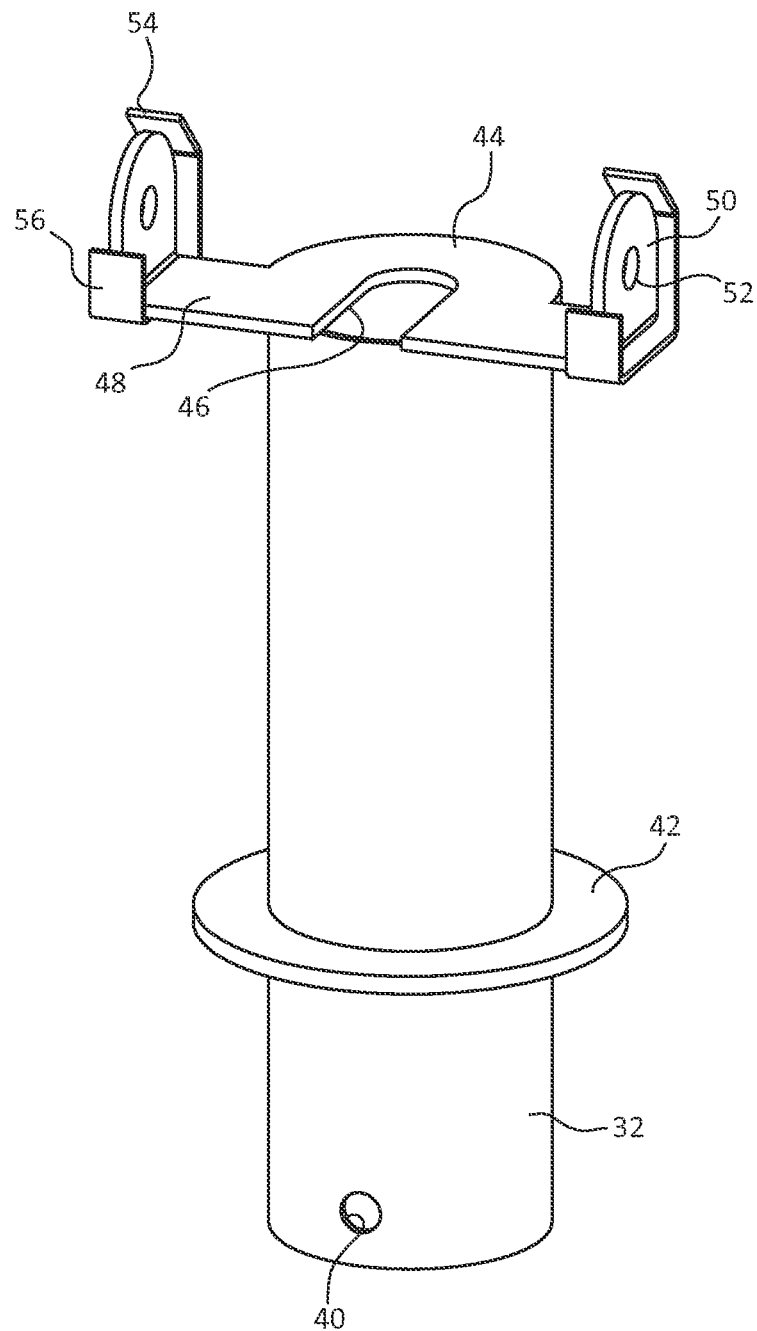
FIG. 3 is a perspective view illustration of a portion of a trunk assembly of the mounting fixture of FIG. 2, according to one embodiment of the present invention.
Figure 4:
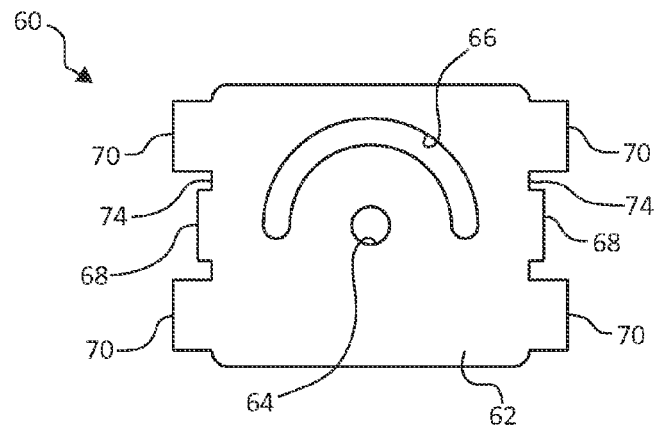
FIG. 4 is a rear view illustration of a pivot mount plate of the trunk assembly of FIG. 3, according to one embodiment of the present invention.
Figure 5:
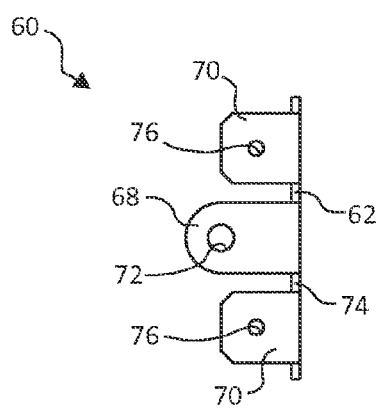
FIG. 5 is a left side view illustration of the pivot mount plate of FIG. 4, according to one embodiment of the present invention.
Figure 6:
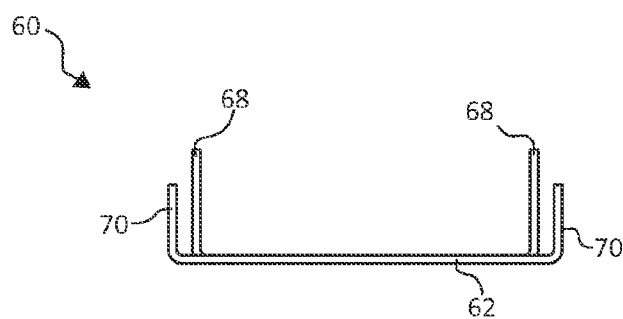
FIG. 6 is a top view illustration of the pivot mount plate of FIG. 4, according to one embodiment of the present invention.

In one example, hinged flange 68 more particularly extends from an inset 74 from a remainder of side edges of primary section 62 of pivot mount plate 60 such that hinge flanges 68 are positioned nearer each other and aperture 64 than each coupling flange 70 is spaced from a corresponding coupling flange 70 on an opposite side of primary section 62 or from aperture 64 as illustrated most clearly in FIGS. 4 and 6. Each hinge flange 68 defines an aperture 72 therethrough sized and shaped substantially identically to apertures 52 formed through hinge flanges 50. Upon assembly, hinge flanges 68 are placed immediately adjacent and just outside corresponding hinge flanges 50 and a suitable fastener (not shown) is placed through aperture 52 and 72 to rotatably couple hinge flanges 50 and 68 to one another. In one embodiment, the fastener is a bolt and nut and is configured to be selectively tightened to substantially prevent rotation of pivot mount plate 60 relative to pivot plate 44 and selectively loosed to allow rotation of pivot mount plate 60 relative to pivot plate 44 as desired by a user. Notably, rotation of pivot mount plate 60 about hinge flanges 50 will be limited to rotation between a first point when pivot mount plate 60 contacts front stop plate 534 and a second point when pivot mount plate 60 contacts rear stop plate 56 (additionally refer to FIG. 3) as will be apparent to those of skill in the art upon reading this application.

Each coupling flange 70 defines an aperture 76 therethrough to facilitate coupling with a cover member 90 (see, e.g., FIGS. 2 and 3). Cover member 90 is configured to cover the rotating mechanism of trunk assembly 36 to provide a more aesthetically pleasing overall look to trunk assembly 36. In one embodiment, cover member 90 defines a top panel 92, a rear panel 94, and opposing side panels 96. Each side panel 96 extends substantially perpendicularly to each of top panel 92 and rear panel 94, in one example. Each side panel 96 defines two apertures (not shown) for receiving coupling members 98. More particularly, upon assembly, side panels 96 are placed immediately adjacent and just outside coupling flanges 70 such that each aperture in side panels 96 aligns with an aperture 76 in a corresponding coupling flange 70. Coupling member 98 extend through each aperture 76 to an aperture (not shown) in one of side panels 96 pair to secure cover member 90 to pivot mount plate 60 and therefore to trunk 32. In one example, rear panel 94 includes an arced cutout 99 (FIG. 2) extending from a bottom edge thereof to allow for additional range of rotational motion of portions of trunk assembly 36 relative to trunk 32, as will be apparent to those of skill in the art upon reading this application.

Figure 7:
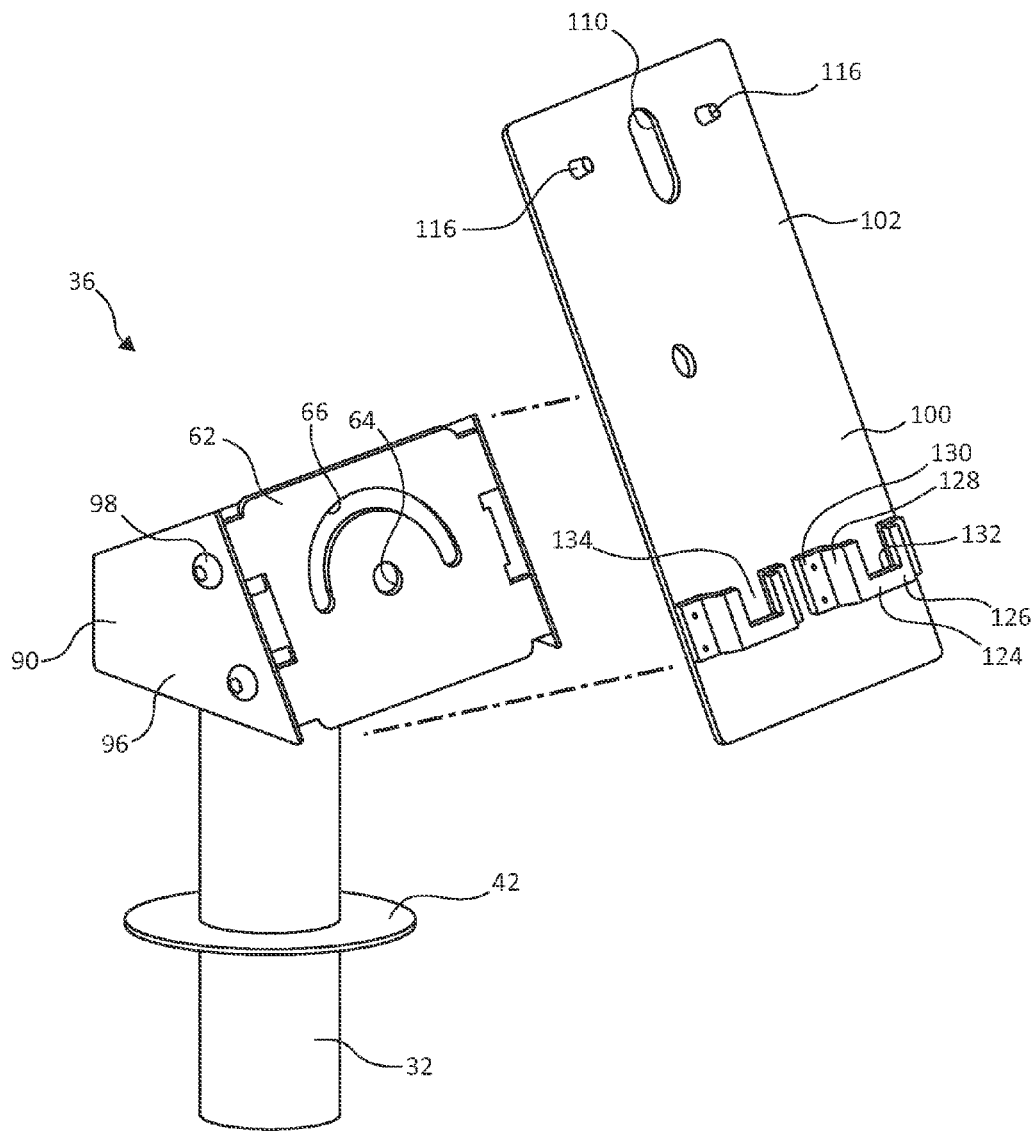
FIG. 7 is a partially exploded, perspective view illustration of a trunk assembly, according to one embodiment of the present invention.
Figure 8:
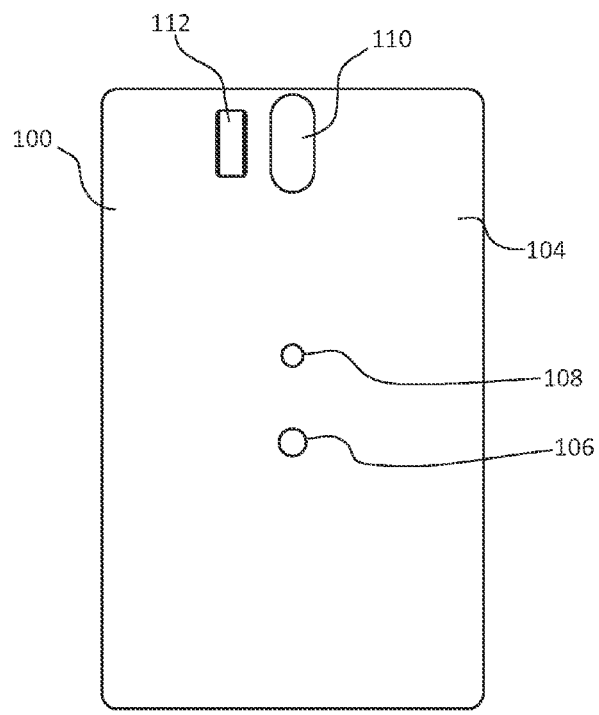
FIG. 8 is a rear view illustration of a mounting plate of the trunk assembly of FIG. 7, according to one embodiment of the present invention.
Figure 9:
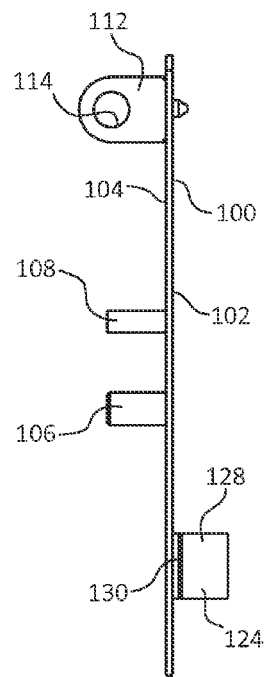
FIG. 9 is a side view illustration of the mounting plate of FIG. 7, according to one embodiment of the present invention.

FIGS. 8, 9, and 7 illustrate one embodiment of mounting plate 100. Mounting plate 100 is substantially planar and defines a front surface 102 and a rear surface 104 opposite front surface 102. In one embodiment, a stud 106 (see FIGS. 8 and 9), such as a threaded stud, extends from rear surface 104 near a center thereof rearwardly away from rear surface 104 with a substantially perpendicular orientation. Stud 106 is sized to fit within aperture 64 of pivot mounting plate 60 as will be further described below. A pin or cam 108 extends from rear surface 104 rearwardly away from rear surface 104 with a substantially perpendicular orientation and is positioned just above stud 106 such that cam 108 is sized and shaped to fit within arced slot 66 in pivot mounting plate 60.

In one embodiment, an elongated slot or other aperture 110 is defined through mounting plate 100 near a top edge thereof. A protrusion or latch 112 extends from rear surface 104 of mounting plate 100 with an orientation substantially perpendicular to rear surface 104. Latch 112 includes an aperture 114 formed transversely therethrough such that latch 112 is configured to facilitate locking of device securement assembly 38 to trunk assembly 36. In one embodiment, alignment pegs 116 extend from front surface 102 in a manner configured to align with corresponding features of device securement assembly 38 as will be further described below.

Lower brackets 124, for example, two lower brackets 124, also extend from front surface 102 of mounting plate 100, according to one embodiment. Each of lower brackets 124 defines a frontmost or middle panel 126, side panels 128 extending rearwardly from opposing edges of middle panel 126, and coupling tabs 130 extending from edges of side panels 128 opposite and substantially parallel to middle panel 126. Coupling tabs 130 fit directly adjacent and are coupled to front surface 102 of mounting plate 100 in any suitable manner such as welding, fasteners, industrial adhesive, etc. As such, a chamber 134 is defined between front surface 102 of mounting plate 100 and middle panel 126 bound on either side by one of side panels 128. In one example, a substantially U-shaped cutout 132 is formed in middle panel to extend downwardly into middle panel 126 from a top edge thereof.

Upon assembly of trunk assembly 36, trunk 32, pivot mounting plate 60 and member are assembled substantially as described above. Then, referring primarily to FIGS. 7-9, mounting plate 100 is added thereto by placing stud 106 through aperture 64 while simultaneously placing cam 108 through arced slot 66. Arced slot 66 allows the rotation of mounting plate 100 relative to pivot mounting plate 60, and therefore, of trunk 32 to be adjusted to a desire position. Once all are properly positioned relative to one another, a bolt or similar fastener (not shown) is placed around and tightened to stud 106 on an opposite side of pivot mounting plate 60 resulting in an assembled trunk assembly 36.

Figure 14:
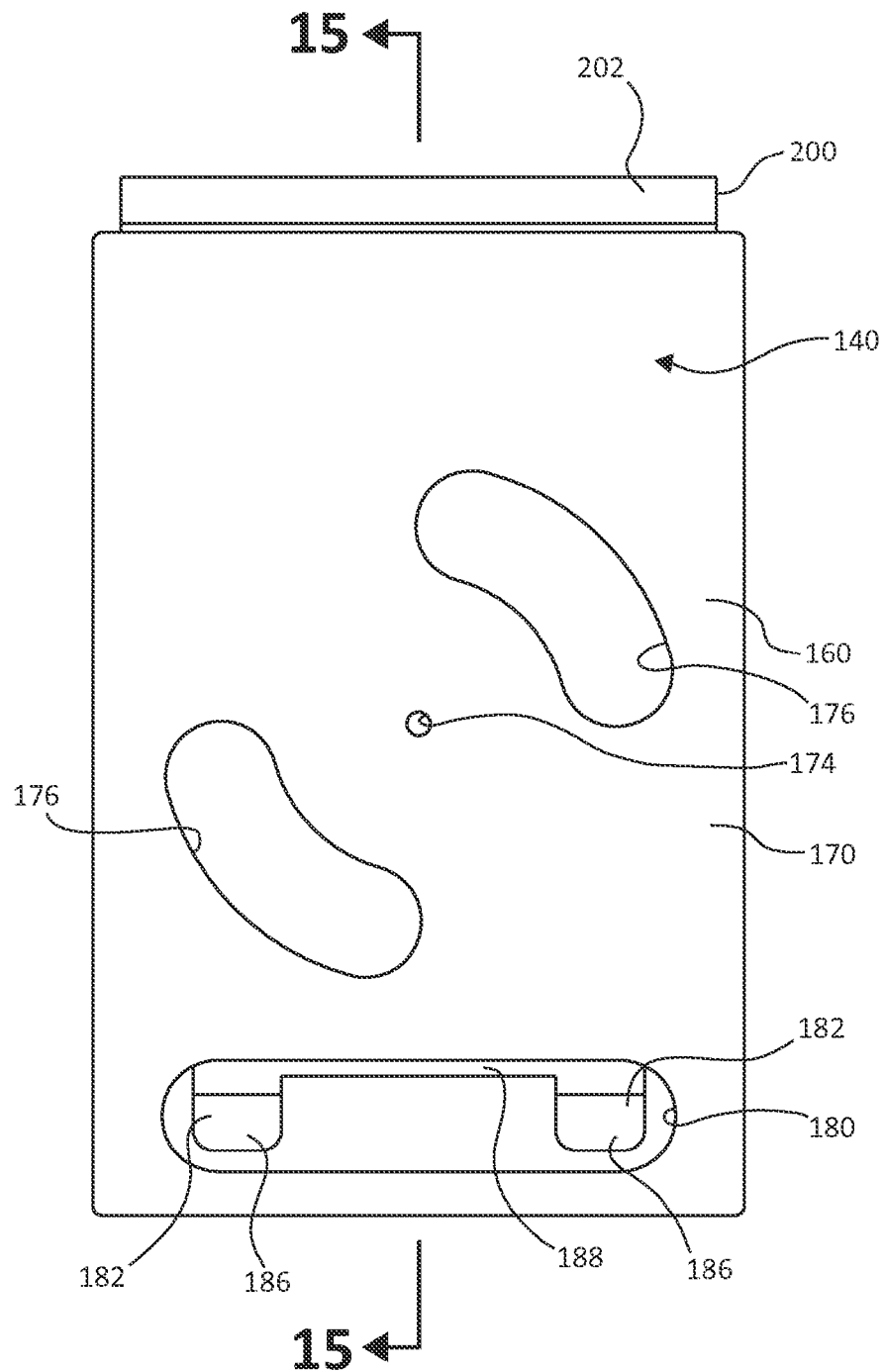
FIG. 14 is a front view illustration of a supporting box of the device securement assembly of FIG. 10, according to one embodiment of the present invention.

FIGS. 10-13 illustrate one embodiment of device securement assembly 38 configured to be mounted on trunk assembly 36. Device securement assembly 38 includes a device securement container or box 140, side appendages or arms 142, a top appendage or arm 144, a bottom appendage or arm 146, a spacer disk 148, a wing nut 150, and a locking tab 152. Additionally referring to FIGS. 14 and 15, box 140 defines a primary panel 160 that is substantially planer and rectangular in one example, sidewalls 162 extend from the right and left side of primary panel 160, top wall 164 extending from a top side of primary panel 160, and a bottom wall 166 extending from a bottom side of primary panel 160. Sidewalls 162, top wall 164, and bottom wall 166 are coupled to one another to form four corners corresponding with corners of primary panel 160 and define a cavity therebetween. Primary panel 160 defines a front surface 170 and a rear surface 172 opposite front surface 170 and surrounded by sidewalls 162.

In one example, a center hub 174 extends from rear wall 166 of primary panel 160 and is substantially centered relative to primary panel 160. Center hub 174 is hollow and has a threaded internal cavity 175 and external threads, according to one embodiment. Arced or curvilinear cutouts 176 are defined through primary panel 160 opposite one another and generally extend in a manner maintaining a substantially consistent radius from center hub 174. In one example, curvilinear cutouts 176 are formed in the first and third quadrants around center hub 174 as viewed from the front, or any other two opposite quadrants or otherwise suitable position. Curvilinear cutouts 176 are configured to allow for ease of device securement assembly 38 adjustments to fit a particular electronic device as will be further described below.

Figure 15:
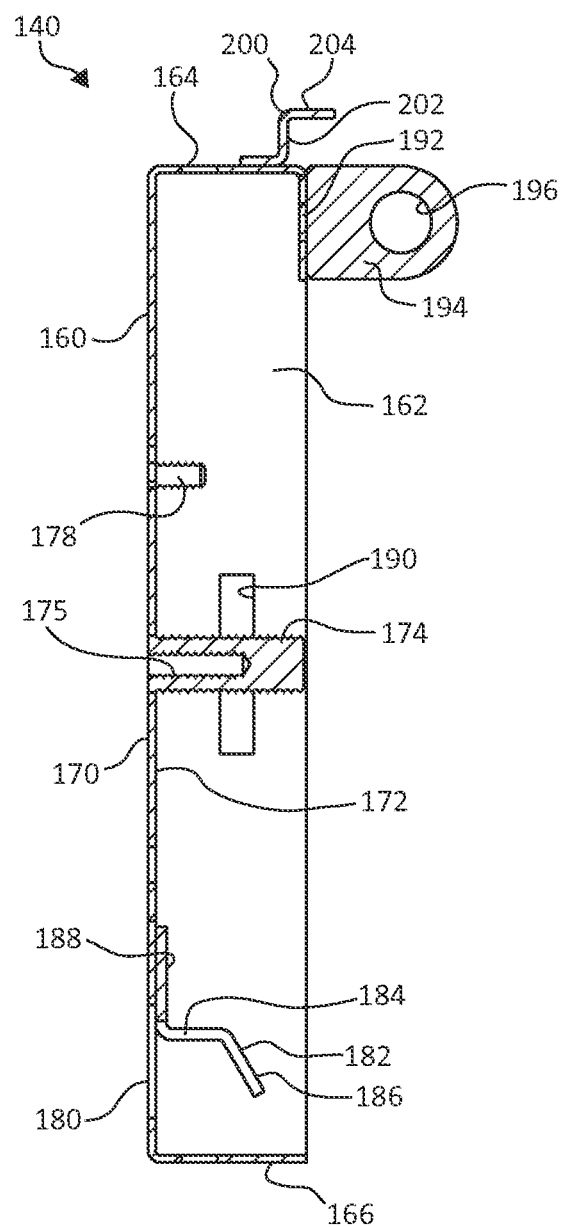
FIG. 15 is a cross-sectional view illustration of the supporting box taken along the line 15-15 in FIG. 14, according to one embodiment of the present invention.

As best illustrated with reference to FIG. 15, a lock-coupling protrusion 178 also extends from rear surface 172 of primary panel 160 of box 140, and in one embodiment, is externally threaded. Lock-coupling protrusion 178 is radially spaced from center hub 174 and is configured to assisting in coupling locking tab 152 to box 140 as will be described in detail below. In the illustrated embodiment, primary panel 160 additionally defines an elongated and laterally extending bottom cutout 180 while in one embodiment, bottom cutout 180 is eliminated.

Hooks 182 rearwardly and downwardly extend from rear surface 172 of primary panel 160 just behind bottom cutout 180. More particularly, in one embodiment, each of two hooks 182 extends rearwardly away from primary panel 160 via a rearwardly extending portion 184 of each hook 182, which extends substantially perpendicularly with respect to rear surface 172. A downwardly extending portion 186 of each hook 182 extends downwardly from an end of rearwardly extending portion 184 opposite rear surface 172. In one example, hooks 182 are flat hooks formed from bent substantially planar plates and are sized, shaped, and positioned such that downwardly extending portions 186 can each be selectively received within a different chamber 134 defined by lower brackets 124 of trunk assembly 36 (see FIG. 7). In one embodiment, hooks 182 are coupled to primary panel 160 via a laterally extending plate 188 welded or otherwise secured to rear surface 172; however, other suitable couplings are also contemplated.

Each of sidewalls 162, top wall 164, and bottom wall 166 define an arm-reception aperture 190 sized and shaped to receive a portion of a corresponding one of side arms 142, top arm 144, and bottom arm 146. Arm-reception apertures 190 of sidewalls 162 are vertically or longitudinally aligned with one another and center hub 174, and arm-reception apertures 190 of top wall 164 and bottom wall 166 are laterally aligned with one another and center hub 174. In one embodiment, each of arm-reception apertures 190 is positioned a different distance from planar panel 160 than the other arm reception apertures 190 as is further described below.

In one embodiment, a rear flange or rear wall 192 extends downwardly from top wall 164 between sidewalls 162, but only to form a short wall less than 25% of the length of sidewalls 162. A latch tab 194 rearwardly extends from rear wall 192 and is sized and shaped similar to latch 112 of trunk assembly 36 (see FIGS. 8 and 9) and positioned to fit through aperture 110 of mounting plate 100 of trunk assembly 36 when device securement assembly 38 is coupled with trunk assembly 36. Further, latch tab 194 defines an aperture 196 therethrough and configured to align with hole 114 in latch 112 when device securement assembly 38 is coupled with trunk assembly 36. In one example, rear wall 193 defines an aperture 196 on either side of latch tab 194 wherein each aperture 196 is sized, shaped, and positioned to receive alignment pegs 116.

To further facilitate alignment of device securement assembly 38 with trunk assembly 36, in one example, a top flange 200 extends from top wall 164 with a first upwardly extending portion 202 positioned directly on a rear edge of top wall 164 and a rearwardly extending portion 204 extending from and substantially perpendicularly to upwardly extending portion 202 opposite top wall 164. When device securement assembly 38 is assembled with trunk assembly 36 (e.g., FIG. 2), a top edge of mounting plate 100 is positioned immediately adjacent a bottom surface of rearwardly extending portion 204 (see FIG. 2) as will be further described below.

Figure 16:
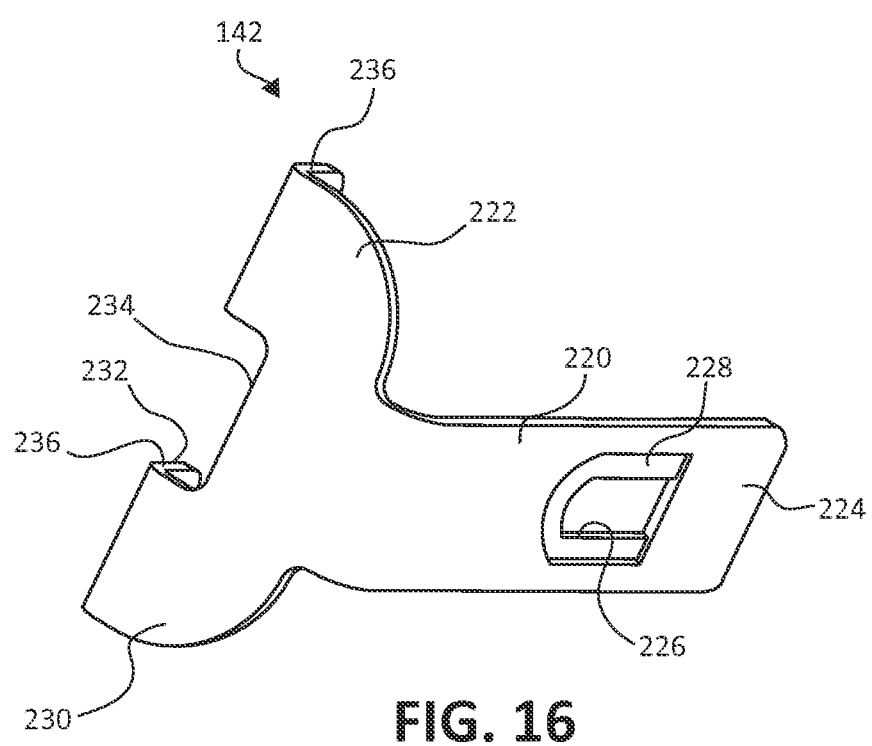
FIG. 16 is a rear perspective view illustration of an arm of the device securement assembly of FIG. 10, according to one embodiment of the present invention.

Each of side arms 142, top arm 144, and bottom arm 146 are formed to be substantially identical other than top arm 144 and bottom arm 146 having longer lengths than side arms 142, in one embodiment. As such, while one of side arms 142 will be described in detail with reference to FIG. 16, it should be understood that the other of side arms 142, top arm 144, and bottom arm 146 are each similarly formed. Side arm 142 of FIG. 16, is, in one instance, formed from metal sheeting such as steel, aluminum, etc. and includes an elongated section 220 and a hooked section 222. Elongated section 220 extends from a first or free end 224 to hooked section 222 and defines an elongated slot 226 therebetween. In one example, elongated slot 226 has a length equal to about half a length of elongated section 220 and/or has a width substantially equal to or greater than central hub 174. In one instance, elongated slot 226 includes a grooved or slightly inset portion 228 extending substantially around an entirety of a perimeter of elongated slot 226.

Hooked section 222 of side arm 142 includes a spacer portion 230 and a return portion 232. Spacer portion 230 extends from an end of elongated section 220 opposite free end 224 with an orientation substantially perpendicular to elongated section 220. In one embodiment, spacer portion 230 extends with a length greater than an expected thickness range of any computing tablets 12 it is configured to maintain. For example, in one instance, the length of spacer portion 230 is greater than approximately one inch and less than approximately one and a quarter inches.

Return portion 232 extends from spacer portion 230 opposite elongated section 220 and with an orientation substantially parallel to elongated section 220 and substantially perpendicularly to spacer portion 230. In one example, an overall width of spacer portion 230 and return portion 232 is substantially larger than an overall width of elongated section 220.

Further, in one embodiment, return portion 232 includes a cutout 234 in a center thereof to define to at least two return prongs 236 spaced from each other.

Figure 18:
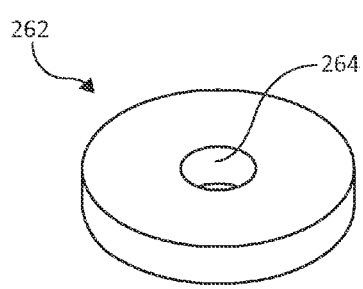
FIG. 18 is a perspective view illustration of a spacer ring of the device securement assembly of FIG. 10, according to one embodiment of the present invention.
Figure 19:
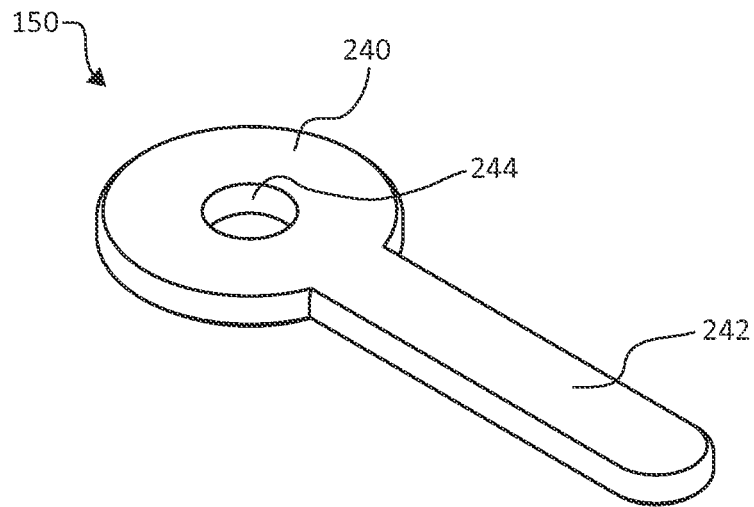
FIG. 19 is a perspective view illustration of a wing nut of the device securement assembly of FIG. 10, according to one embodiment of the present invention.

During assembly of device securement assembly 38, free end 224 of side arms 142, top arm 144, and bottom arm 146 are each inserted through one of arm apertures 190 in sidewalls 162, top wall 164, and bottom wall 166, respectively, of box 140 and elongated slot 226 of each of side arms 142, top arm 144, and bottom arm 146 is place over central hub 174. In one example, each of arm apertures 190 is spaced from primary panel 160 a slightly different distance such that upon assembly, elongated sections 220 of side arms 142, top arm 144, and bottom arm 146 are stacked over central hub 174. For instance, as illustrated, top arm 144 is first positioned on central hub 174, followed by bottom arm 146, and then each of side arms 142. In one embodiment, a spacer ring 262, or more particularly, a central aperture 264 of spacer ring 262 (see FIGS. 10, 13, and 18), is placed on central hub 174 prior to any of side arms 142, top arm 144, and bottom arm 146 to maintain each of side arms 142, top arm 144, and bottom arm 146 substantially parallel to primary panel 160 of box 140. Although not illustrated washers, such as teethed washers, or other spacers (not illustrated) are positioned around central hub 174 between and/or on either side of each of side arms 142, top arm 144, and bottom arm 146 to help maintain the position of each relative to primary panel 160 wherein each spacer has a diameter to substantially fit within the confines of a corresponding inset 228 around elongated slots 226 as will be apparent to those of skill in the art.

Referring to FIGS. 10, 12, 13, and 19, in one embodiment, wing nut 150 of device securement assembly 38 includes a coupling portion 240 and a handle 242. Coupling portion 240 defines a threaded aperture 244 in the center thereof sized and shaped to receive central hub 174. Wing nut 150 is placed on central hub 174 after side arms 142, top arm 144, and bottom arm 146 are positioned on central hub 174. Due to the threading of central hub 174 and aperture 244, rotating wing nut 150 about central hub 174 tightens wing nut 150 on central hub 174 and, thereby, tightens side arms 142, top arm 144, and bottom arm 146 in place relative to central hub 174. Handle 242 extends radially outwardly from coupling portion 240 and facilitates a user in tightening or loosening wing nut 150 on central hub 174. In addition, in one embodiment, handle 242 facilitates locking wing nut 150 in place on central hub 174.

Figure 10:
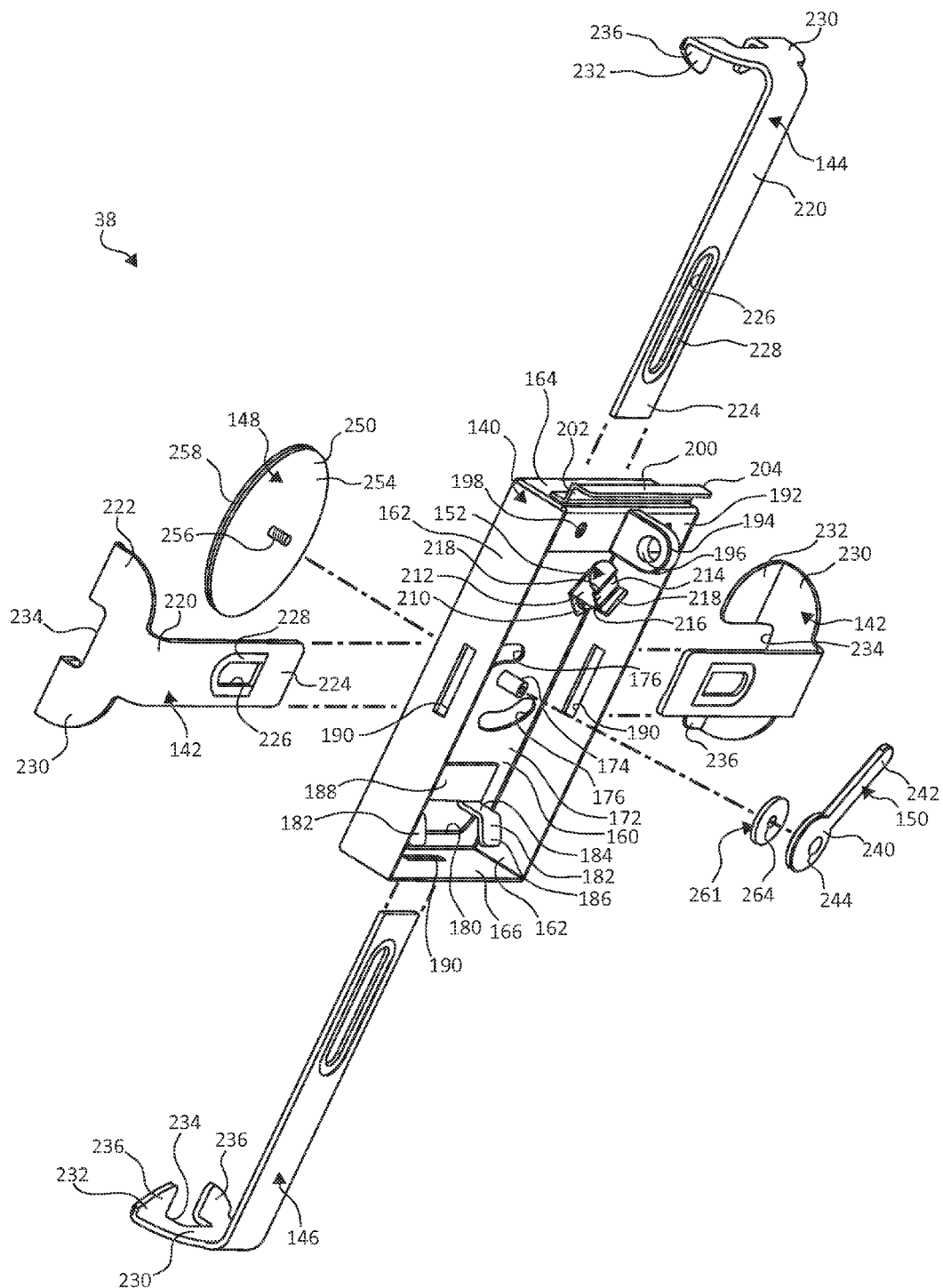
FIG. 10 is an exploded, rear perspective view illustration of a device securement assembly of the mounting fixture of FIG. 2, according to one embodiment of the present invention.
Figure 11:
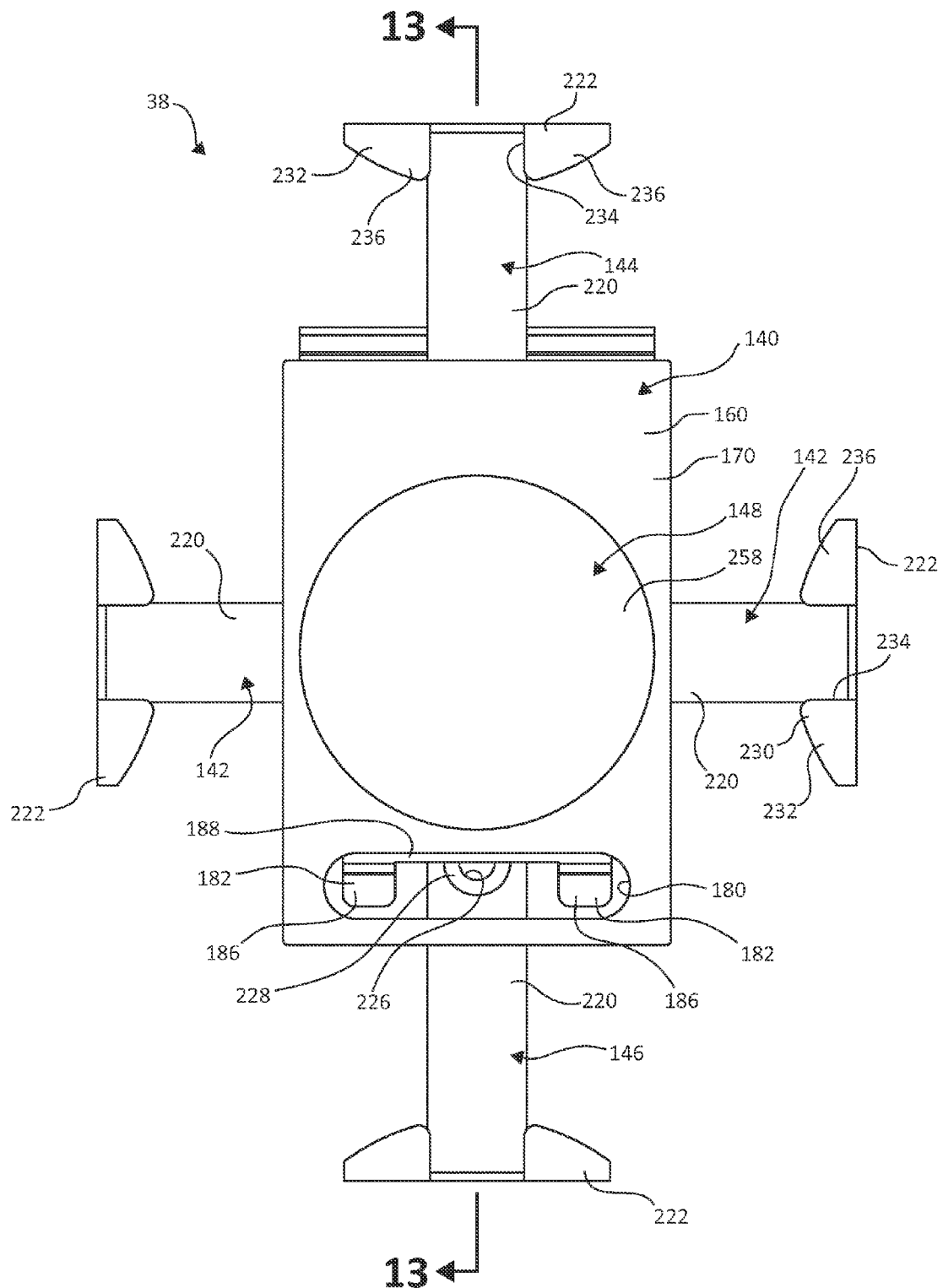
FIG. 11 is a front view illustration of the device securement assembly of FIG. 10, according to one embodiment of the present invention.
Figure 12:
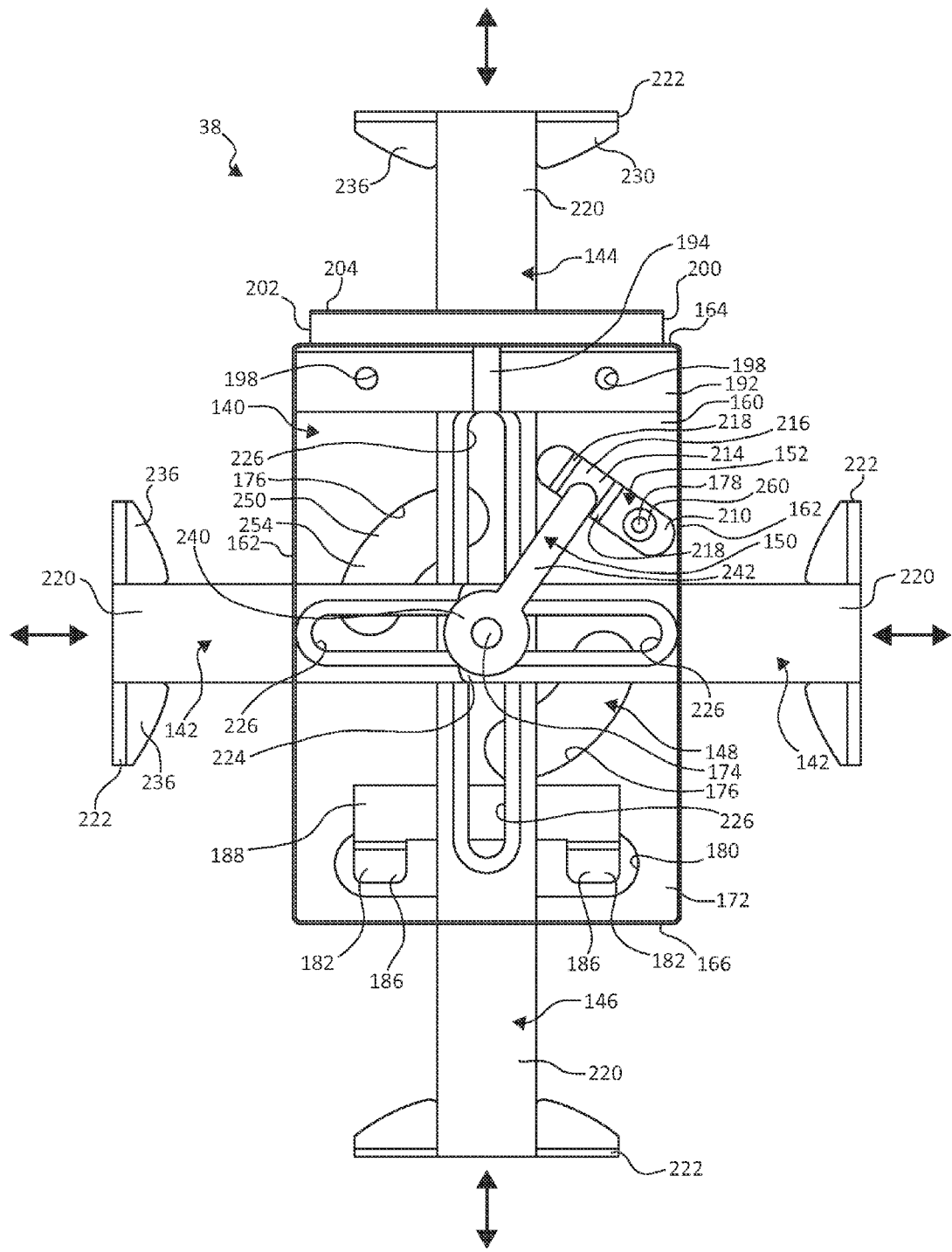
FIG. 12 is a rear view illustration of the device securement assembly of FIG. 10, according to one embodiment of the present invention.
Figure 13:
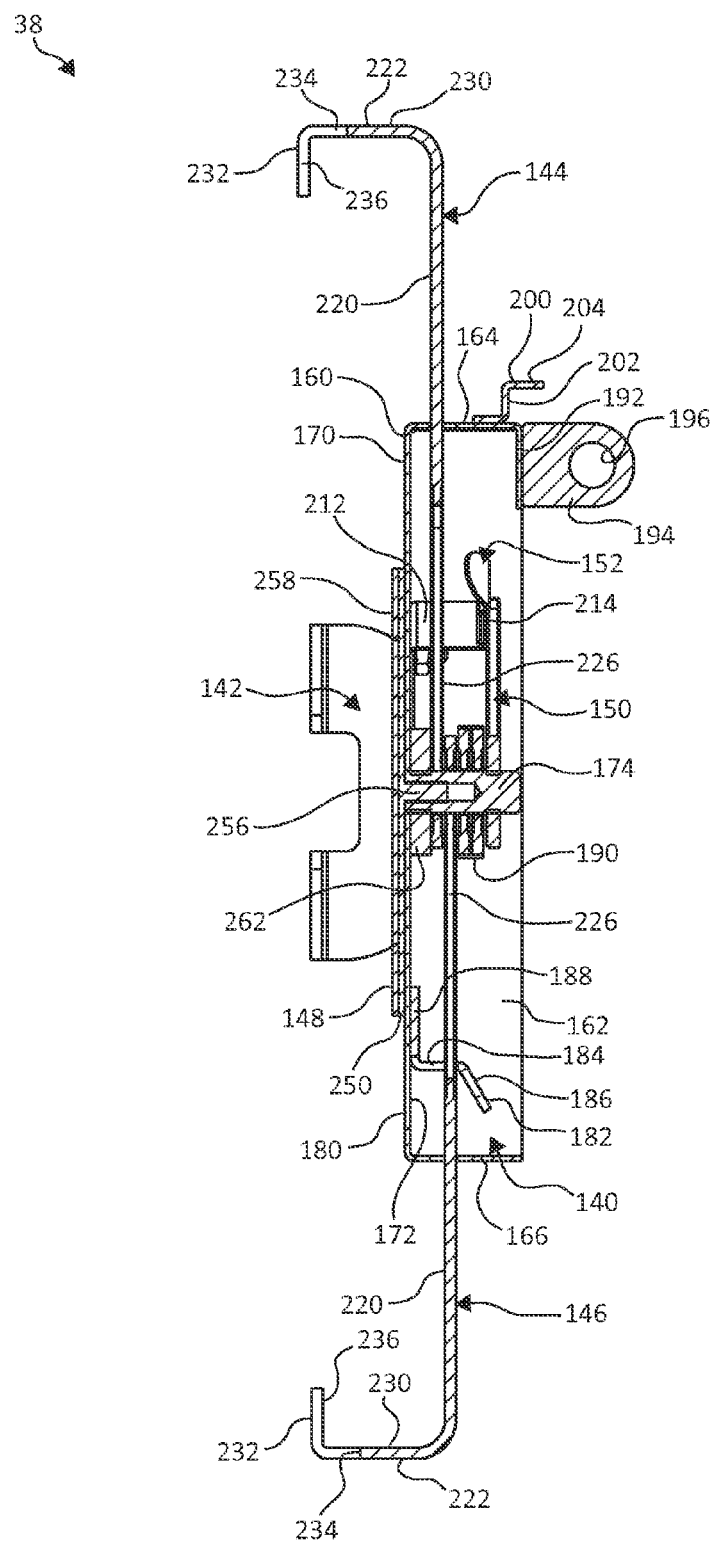
FIG. 13 is a cross-sectional view illustration of the device securement assembly taken along the line 13-13 in FIG. 11, according to one embodiment of the present invention.
Figure 20:
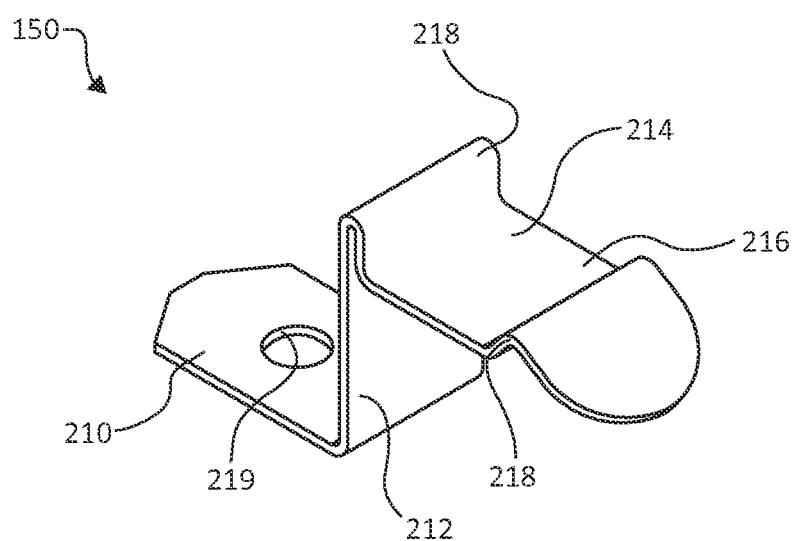
FIG. 20 is a perspective view illustration of a locking member of the device securement assembly of FIG. 10, according to one embodiment of the present invention.

More particularly, in one example, locking tab 152 is secured to box 140 and is configured to interact with handle 242 to securely maintain or lock wing nut 150 in place relative to central hub 174. Referring to FIG. 20, in one embodiment, locking tab 152 includes a first planar portion 210 and a second planar portion 212 extending substantially perpendicularly to and from one end of first planar portion 210. Third portion 214 generally extends substantially perpendicularly from second planar portion 212 in a manner defining a substantially planar platform 216 bordered by stops 218 extending further away from first planar portion 210 than substantially planar platform 216 ion either side of substantially planar platform 216. First planar portion 210 defines an aperture 219 therethrough and sized and shaped to receive lock-coupling protrusion 178 as illustrated in FIGS. 10, 12, and 15. Once placed on lock-coupling protrusion 178 a fastener 260 (FIG. 12) is placed over lock-coupling protrusion 178 to secure locking tab 152 in place. When so positioned, when wing nut 150 is fully tightened, handle 242 fits directly over substantially planar platform 216. In a manner substantially maintaining handle 242 between stops 218.

Figure 17:
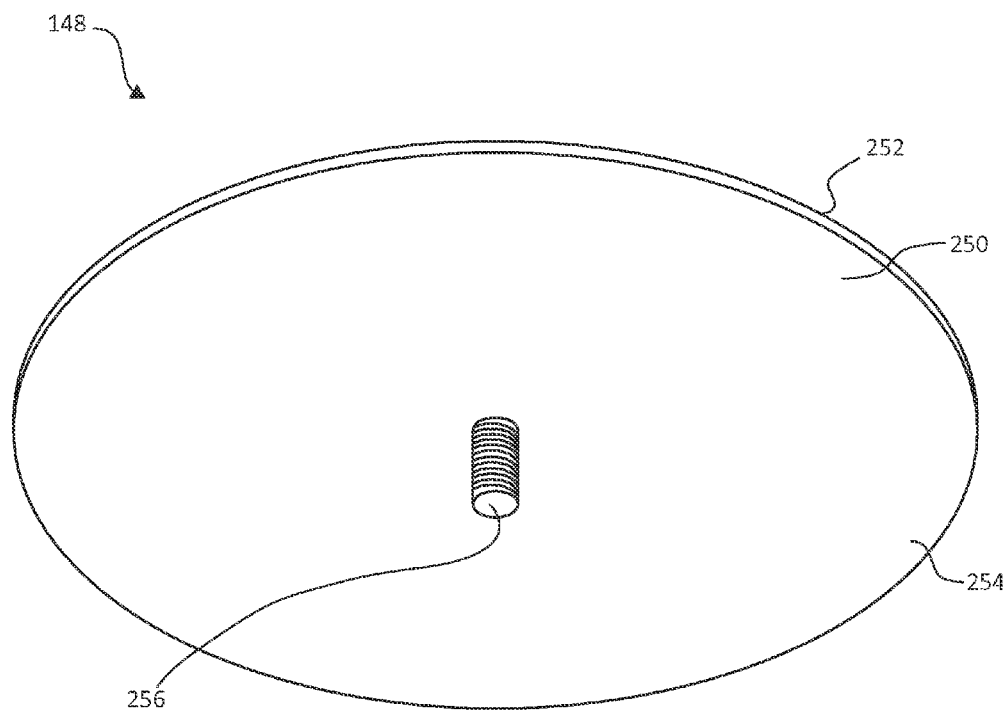
FIG. 17 is a perspective view illustration of a spacer disk of the device securement assembly of FIG. 10, according to one embodiment of the present invention.

To facilitate adjusting device securement assembly 38, spacer disk 148 is adjustably secured to front surface 170 of primary panel 160. Referring to FIG. 17, spacer disk 148 includes a substantially planar circular member 250 with a front surface 252 opposite a rear surface 254. A threaded stud 256 extends away from the center of rear surface 254 and is sized and shaped to be received within threaded internal cavity 175. As spacer disk 148 is rotated clockwise, substantially planar circular member 250 is moved closer to front surface 170 of primary panel 160. Conversely, as spacer disk 148 is rotated counterclockwise, substantially planar circular member 250 is moved further away from front surface 170 of primary panel 160. In one example, a pad 258 is applied and extends over a substantial entirety of front surface 252 of spacer disk 148 and is configured to interface directly with a back surface (not shown) of computing tablet 12.

As described or at least alluded to above, assembled device securement assembly 38 is adjustable to receive a particular computing tablet 12. For example, wing nut 150 is turned counterclockwise to loosen wing nut 150 on center hub 174 and side arms 142, top arm 144, and bottom arm 146 are each linearly slide in a direction parallel to the elongated extension of elongated section 220 as indicated, for example, by arrows in FIG. 12. The range of linear motion of each of side arms 142, top arm 144, and bottom arm 146 is equal to the length of the respective elongated slot 226 in each.

During use, side arms 142, top arm 144, and bottom arm 146 are adjusted based on a length and width of computing tablet 12 such that perimeter edges 310 of computing tablet 12 (FIG. 1) are each tightly maintained between two return prongs 236 and elongated section 220 near spacer portion 230. In one example, perimeter edges 310 each contact spacer portions 230 of each of side arms 142, top arm 144, and bottom arm 146. Once side arms 142, top arm 144, and bottom arm 146 are linearly adjusted to their desired position with a respective one of computing tablet 12 maintained therebetween, wing nut 150 is turned clockwise tightening down on side arms 142, top arm 144, and bottom arm 146 and placing handle 242 on planar platform 216 between stops 218 to lock handle 242, and therefore, wing nut 150, in place.

Even with side arms 142, top arm 144, and bottom arm 146 tightly maintaining perimeter edges 310 of computing tablet 12, computing tablet 12 may not be tightly maintained in third direction since different computing tablets 12 have different thicknesses. To tightly secure computing table 12 in this third direction, spacer disk 148 is adjusted by rotating spacer disk 148 counterclockwise relative to box 140 to move spacer disk 148 toward the two return prongs 236 (that is in and out of the page when referring to FIG. 12) of each of side arms 142, top arm 144, and bottom arm 146 until pad 258 on spacer disk 148 relatively tightly interacts with a rear surface (not shown) of computing tablet 12 and front surface 312 (FIG. 1) of computing tablet 12 contacts rear surfaces of two return prongs 236 on each of side arms 142, top arm 144, and bottom arm 146. In one embodiment, when computing tablet 12 is in secured in place, it covers front surface 252 and pad 258 of spacer disk 148. A user adjusting spacer disk 148 accesses rear surface 254 of spacer disk 148 with one or more fingers contacting rear surface 254 through curvilinear cutouts 176 as shown in FIG. 12 to rotate spacer disk 148 thereby tightening spacer disk 148 on computing tablet 12.

Once computing tablet 12 is securely maintained between side arms 142, top arm 144, and bottom arm 146 and spacer disk 148, device securement assembly 38 with computing tablet 12 is coupled with trunk assembly 36, which may or may not already be positioned within a corresponding aperture 28 of base 20. More specifically, referring primarily to FIGS. 2 and 7, device securement assembly 38 is tilted forwardly and the two hooks 182 are each placed within a corresponding chamber 134 defined by lower brackets 124 in front of mounting plate 100. Once hooks 182 are so positioned, device securement assembly 38 is rotated rearwardly about hooks 182 so that rear edges of side walls 162, top wall 164, and bottom wall 166 of box 140 contact front surface 102 of mounting plate 100. When in this position, latch tab 194 extends through top aperture 110 and a top edge of mounting plate 100 contacts rearwardly extending portion 204 and front surface 102 of mounting plate 100 directly contacts a rear surface of upwardly extending portion 202. Coupling device securement assembly 38 with trunk assembly 36 includes threading any cords or external wiring (not shown) of computing tablet 12 through trunk assembly 26, in particular, trunk 32, and down into base 20 through mounting sleeve 28 (FIG. 1). Cords within base 20 are then attached to a power source (not shown) located therein such that computing tablet 12 can be powered and functional while on display.

In one embodiment, once device securement assembly 38 is in place relative to trunk assembly 36, a lock 120 is positioned just rearwardly from mounting plate 100 and, in one example, to extend through hole 114 in latch 112 and aperture 196 in latch tab 194 to securely hold device securement assembly 38 coupled to trunk assembly 36. Lock 120 can only be opened via an appropriate key in keyhole 122 of lock 120, entering an appropriate combination, or other suitable arrangement. When device securement assembly 38 is coupled to trunk assembly 36, mounting plate 100 of trunk assembly 36 extends over an entire opening of box 140 along a back edge thereof. As such, access to spacer disk 148 via curvilinear cutout 176 and to wing nut 150 is prevented while device securement assembly 38 is coupled to and locked with trunk assembly 36. As a result, computing tablet 12 generally cannot be removed from device securement assembly 38 without the appropriate key, combination, etc. to unlock lock 120 and allow separation of trunk assembly 36 from device securement assembly 38.

Figure 21:
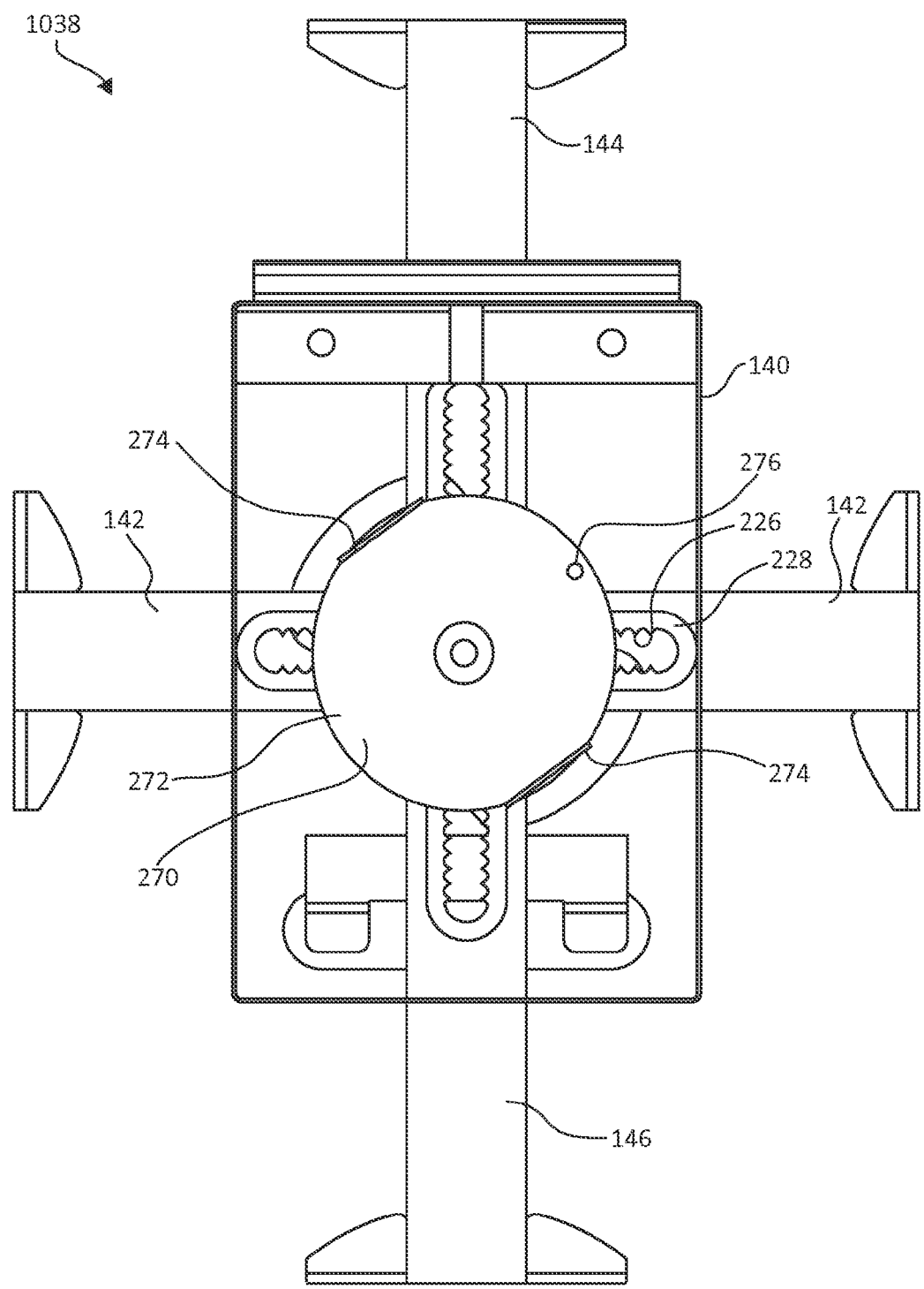
FIG. 21 is a rear view assembly of a device securement assembly, according to another embodiment of the present invention.
Figure 22:
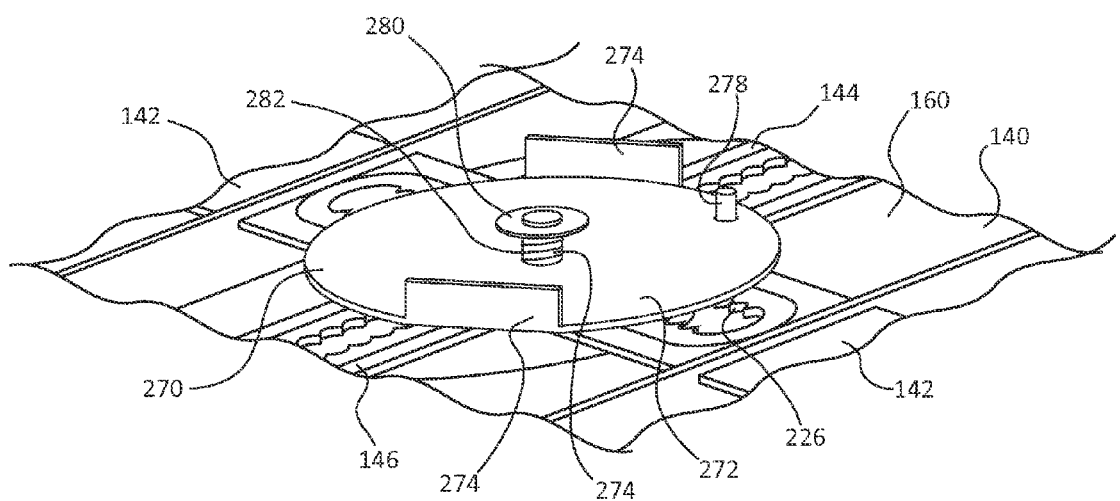
FIG. 22 is a detail, perspective view illustration of a portion of the device securement assembly of FIG. 21 with a spacer disk in a locked position, according to one embodiment of the present invention.
Figure 23:
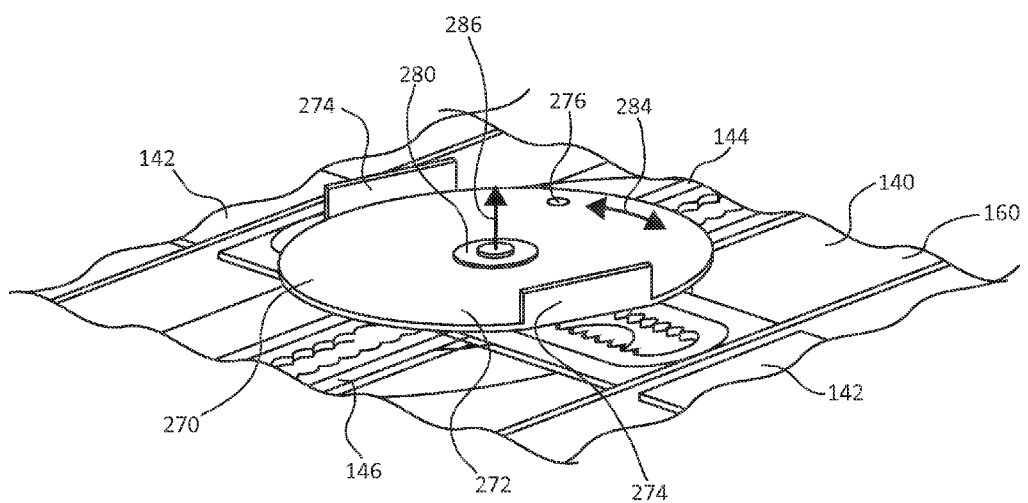
FIG. 23 is a detail, perspective view illustration of a portion of the device securement assembly of FIG. 21 with a spacer disk in an unlocked position, according to one embodiment of the present invention.

FIGS. 21-23 illustrate a device securement assembly 1038 having substantially identical components and assembly of those components as described for device securement assembly 38 above except for the differences specifically enumerated herein. In one embodiment, device securement assembly 1038 includes an alternate locking system for securing side arms 142, top arm 144, and bottom arm 146 in place. In particular, a rotating disk 270, a locking stud 278, and spring 282 are used in place of wing nut 150 and locking tab 152. Side arms 142, top arm 144, and bottom arm 146 are placed through corresponding arm apertures 190 and elongated slots 226 over center hub 174 substantially as described above. In one embodiment, elongated slots 226 are teethed to more smoothly rotate along correspondingly teethed washers (not shown) placed between each of side arms 142, top arm 144, and bottom arm 146, as will be apparent to those of skill in the art reading the application.

Rotating disk 270 includes a primary planar member 272, which is substantially circular, with two opposite, upturned side flanges 274. Primary planar member 272 defines an aperture (not shown) through a center thereof and fitting over center hub 174 to couple rotating disk thereto. More specifically, rotating disk 270 is placed on center hub 174 after each of side arms 142, top arm 144, and bottom arm 146. Spring 282 is placed around center hub 174 after rotating disk 270, and a cap 280 is placed on the center hub 174. Spring 282 pushes against cap 280 biasing rotating disk 270 in a position pressing side arms 142, top arm 144, and bottom arm 146 toward primary panel 160 of box 140, thereby, pressing and holding each of side arms 142, top arm 144, and bottom arm 146 in place relative to box 140.

A static locking stud 278 extends from rear surface 172 of primary panel 160 substantially parallel to center hub 174 and is configured to interface with primary substantially planar panel 272. In particular, primary, substantially planar panel 272 defines an aperture 276 (FIG. 23) near the outer edge thereof and sized to selectively fit over locking stud 278. Rotating disk 270 is biased toward side arms 142, top arm 144, and bottom arm 146 toward primary panel 160 of box 140 when aperture 276 is placed over locking stud 278 as shown, for example, in FIG. 22.

When a user wishes to adjust side arms 142, top arm 144, and/or bottom arm 146, the user pulls up on rotating disk 270, for example, by pulling on upturned side flanges 274 to move primary, substantially planar panel 272 away from primary panel 160 of box 140 (see arrow 286 in FIG. 23) overcoming the bias of spring 282. While rotating disk 270 is pulled away from primary panel 160 and locking stud 278, the user rotates rotating disk 270, for example, in a counterclockwise direction (see arrow 284 in FIG. 23) to misalign aperture 276 and locking stud 278. This misalignment prevents rotating disk 270 from moving back toward primary panel 160 allowing side arms 142, top arm 144, and bottom arm 146 to be slid to their desired position such that an associated computing tablets 12 can be removed from or securely placed within hooked sections 222 of side arms 142, top arm 144, and bottom arm 146. Rotation of rotating disk 270 to re-align locking stud 278 and aperture 276 such that upon user release of rotating disk 270 causes rotating disk 270 to move toward primary panel 160 due to the bias of spring 282 back to the position of FIG. 22.

Figure 24:
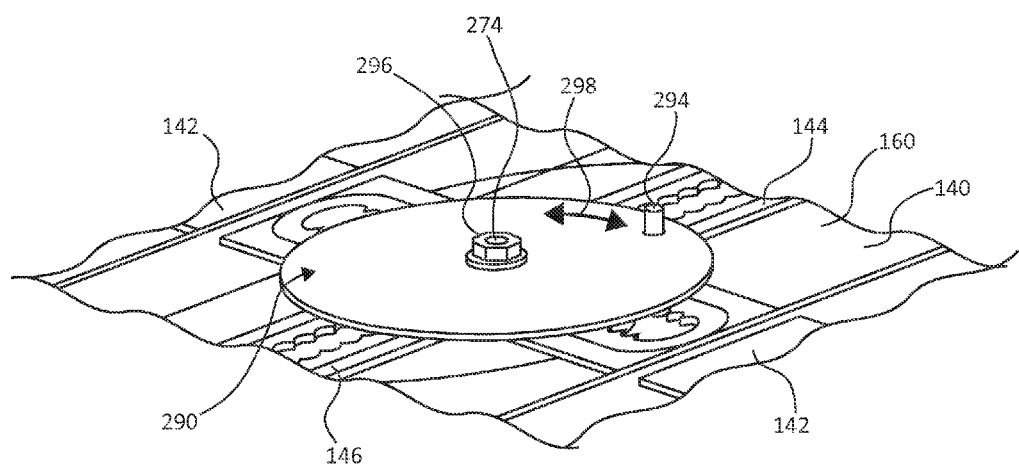
FIG. 24 is a detail, perspective view illustration of a portion of a device securement assembly, according to yet another embodiment of the present invention.
Figure 25:
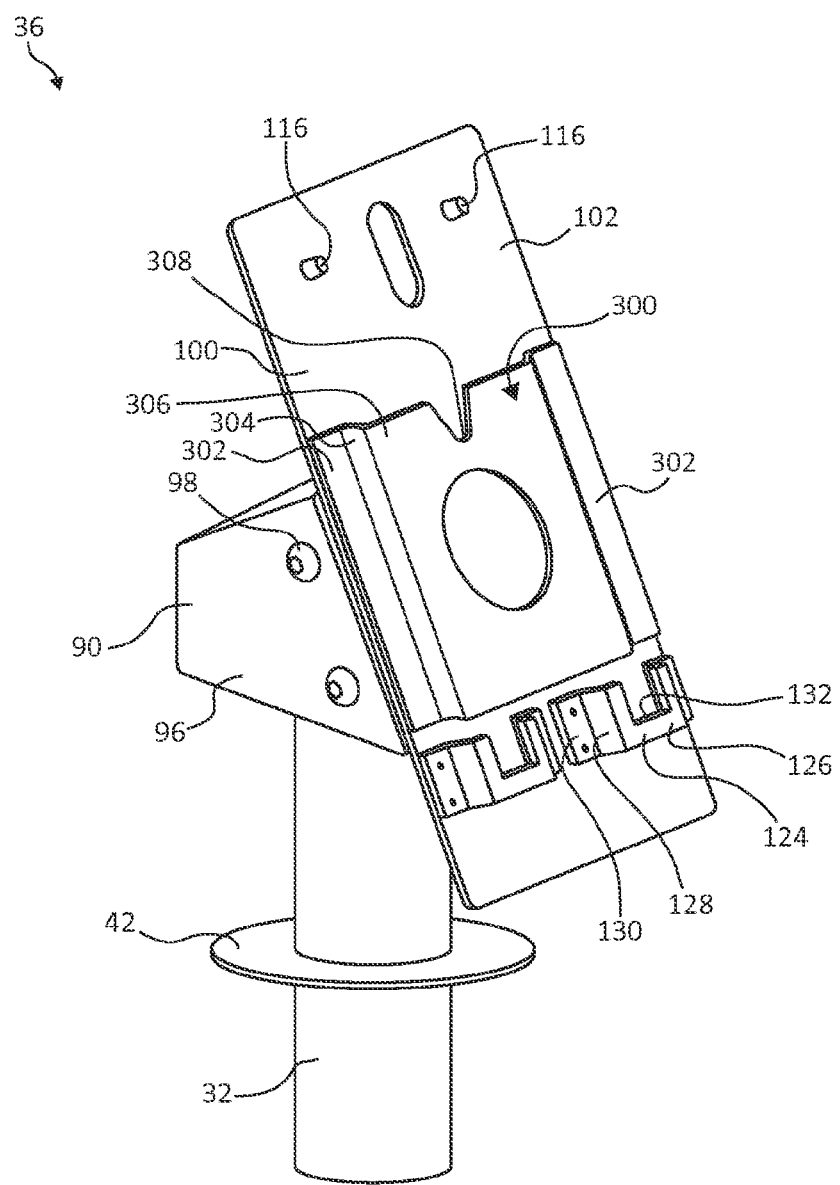
FIG. 25 is a perspective view illustration of a mounting trunk assembly for use with the device securement assembly of FIG. 22, according to another embodiment of the present invention.

FIGS. 24 and 25 collectively illustrate yet another embodiment for locking side arms 142, top arm 144, and bottom arm 146 in place relative to box 140. In this embodiment, wing nut 150 and locking tab 152 are again removed and replaced with a rotating disk 290, which, like rotating disk 270, is placed over and rotatable relative to central hub 274 of box 140 and secured with a nut 296 or other suitable device. Rotating disk 290 includes a primary, substantially planar panel 292, which forms the aperture (not shown) for receiving central hub 274, and a protruding post 294 extending rearwardly from primary, substantially planar panel 292.

When a user rotates rotating disk 290 (see arrow 298 in FIG. 24), for example, by using protruding post 294 as a handle, in a clockwise direction, rotating hub moves closer to primary panel 160 of box 140 to tighten side arms 142, top arm 144, and bottom arm 146 in place relative to primary panel 160. Conversely, by using protruding post 294 as a handle, in a counterclockwise direction, rotating hub moves farther away from primary panel 160 of box 140 to loosen side arms 142, top arm 144, and bottom arm 146 allowing slidable movement of side arms 142, top arm 144, and bottom arm 146 relative to primary panel 160.

To help ensure that rotating disk 290 is properly tightened when device securement assembly 38 is coupled to trunk assembly 36, as illustrated in FIG. 25, trunk assembly 36 additionally includes a locking plate 300 including two opposing coupling flanges 302, two spacing flanges 304, and an intermediate portion 306. Intermediate portion 306 is substantially planar and includes an upper cutout 308 designed to receive protruding post 294 when rotating disk 290 is fully tightened or locked placing protruding post 294 at a topmost position. Spacing flanges 304 each rearwardly extend from opposite longitudinal edges of intermediate portion 306, and coupling flanges 302 extend substantially parallel to intermediate portion 306 and transversely outwardly away from opposite edges of spacing flanges 304. Coupling flanges 302 are placed directly adjacent front surface 102 of mounting plate 100 and welded, adhered, fastened and/or otherwise suitably secured thereto.

With the addition of locking plate 300, device securement assembly 38 can only be properly coupled with trunk assembly 36 when protruding post 294 is fully tightened and in a topmost position such that protruding post 294 fits within upper cutout 308 when device securement assembly 38 and trunk assembly 36 are aligned for assembly. As such, there is at least partial piece-of-mind that side arms 142, top arm 144, and bottom arm 146 are suitably locked in place if device securement assembly 38 and truck assembly 36 can be coupled together in a manner allowing lock 120 (FIG. 2) to be applied and locked.

Figure 27:
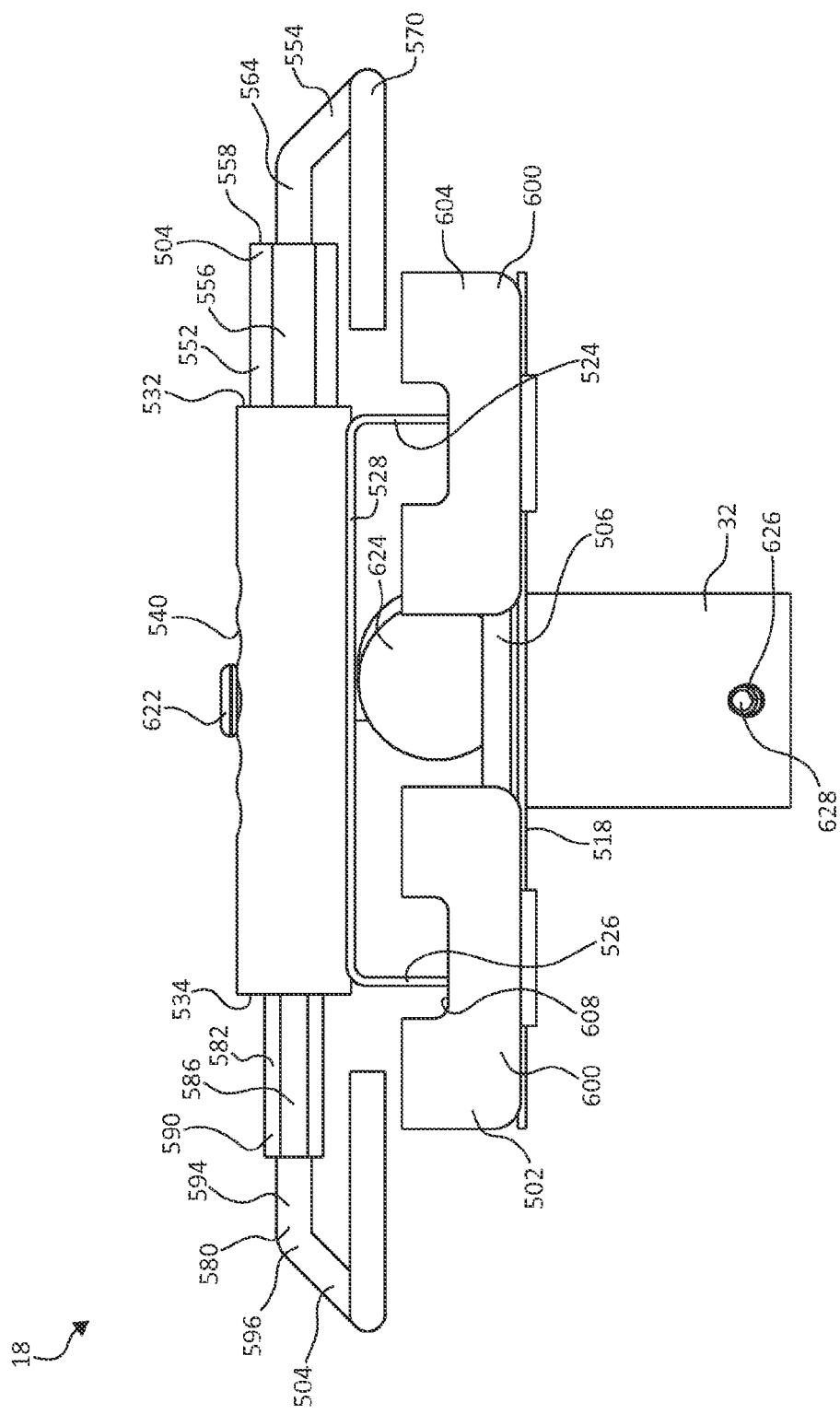
FIG. 27 is a front view illustration of the mounting fixture of FIG. 26, according to another embodiment of the present invention.
Figure 28:
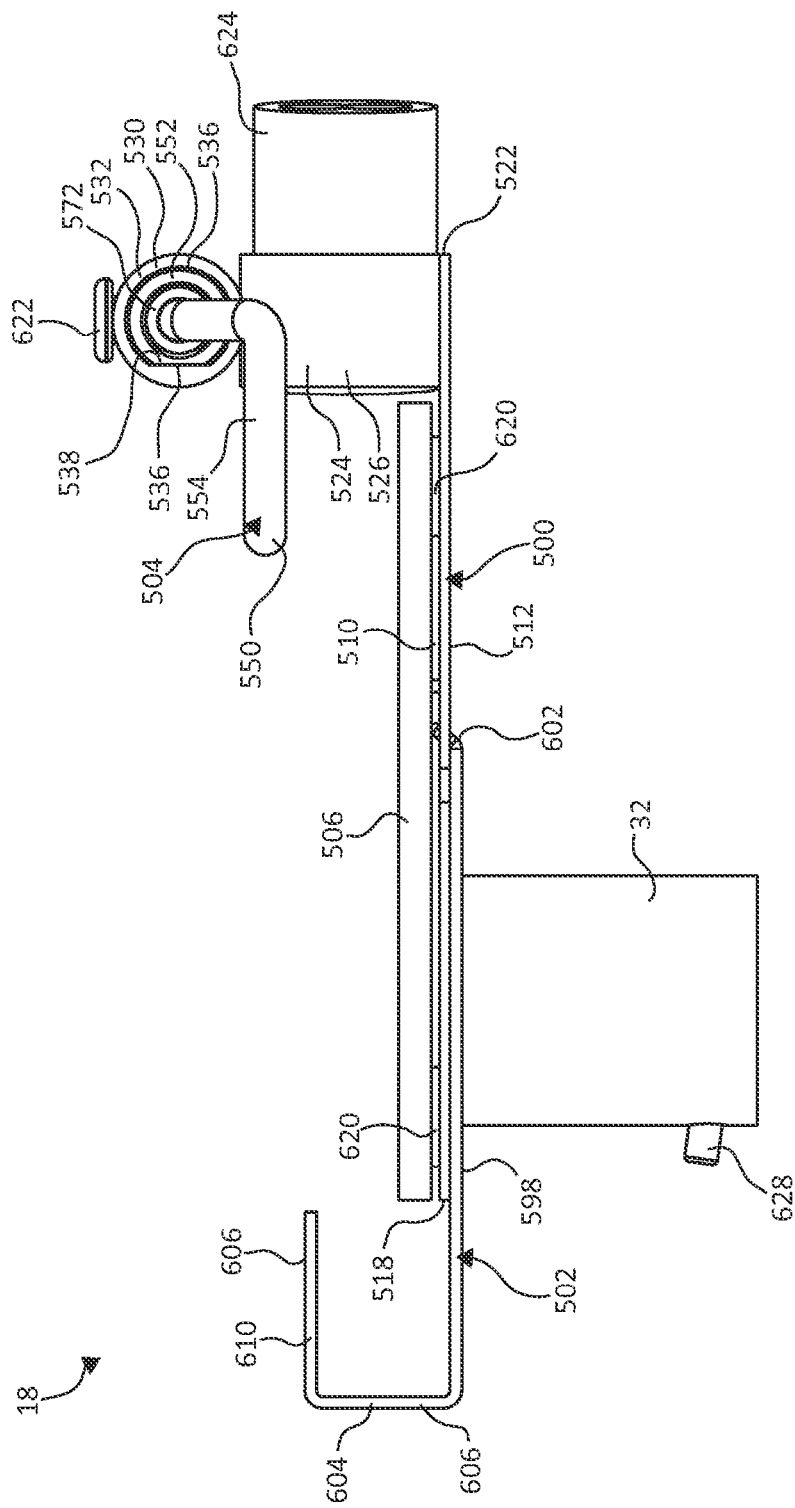
FIG. 28 is a right side view illustration of the mounting fixture of FIG. 27, according to another embodiment of the present invention.
Figure 29:
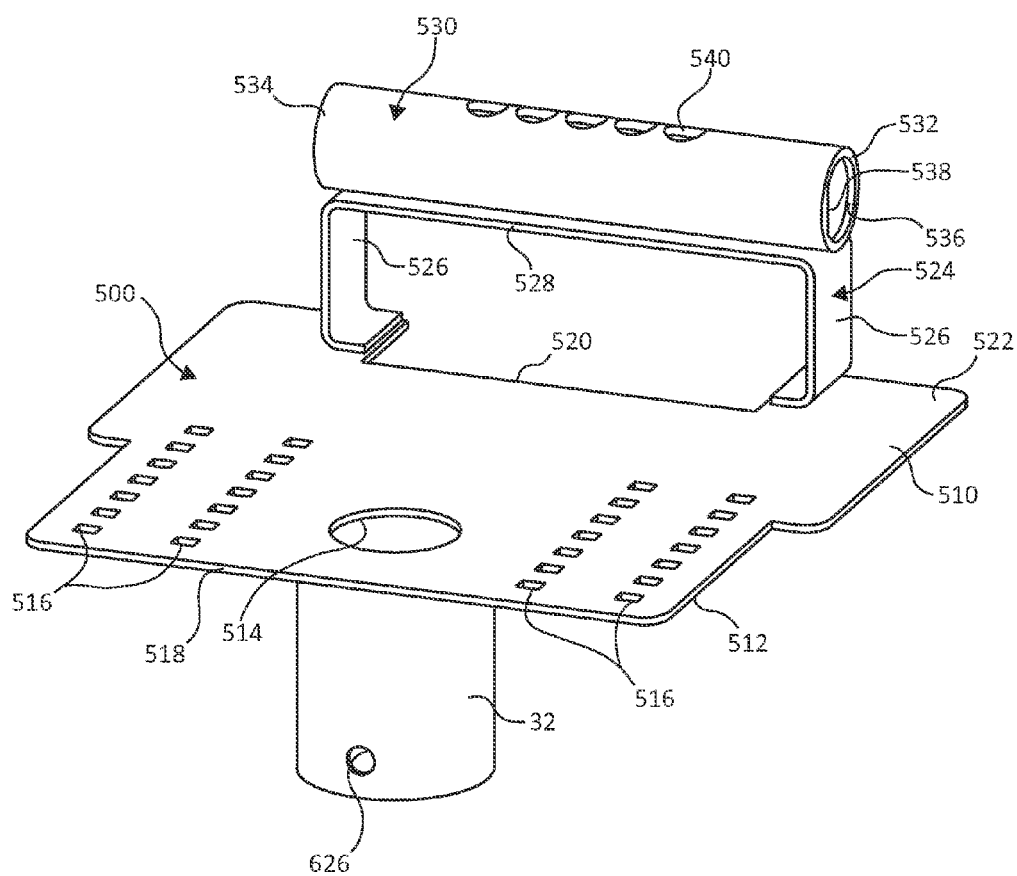
FIG. 29 is perspective view illustration of a portion of the mounting fixture of FIG. 26, according to another embodiment of the present invention.

One embodiment of mounting fixture 18 used to secure and support computing notebooks 14 is illustrated with reference to FIGS. 1, 26, 27, and 28. Mounting fixture 18 includes a supporting platform 500, adjustable arms 502, a back screen support 504, and a supporting pad 506. Both adjustable arms 502 and back screen support 504 provide adjustability to more securely receive and support any one of a variety of computing notebooks 14. FIG. 29 illustrates one example of supporting platform 500 and additional portions of mounting fixture 18.

Supporting platform 500 is substantially planar and has a size and width configured to securely support computing notebook thereon (e.g., sized and shaped to be more than about half a length and a width of a bottom or keyboard portion 632 (FIG. 1) of computing notebook 14. Supporting platform 500 defines a top surface 510 and a bottom surface 512 opposite top surface 510. A cord access aperture 514 is defined laterally centered and near a front edge 518 of supporting platform 500. Hollow trunk 32 is coupled to bottom surface of supporting platform 500 in a manner aligning or centered on cord access aperture 32. In one embodiment, trunk 32 includes a lower aperture 626 for receiving a spring-loaded pin 628 (FIGS. 26, 27, and 28) for interfacing with mounting sleeve 30 (FIG. 1) in a manner that will be apparent to those of skill in the art upon reading the present application.

Supporting platform 500 additionally defines apertures 516 arranged in two substantially identical arrays on either side of cord access apertures 514. In one example, each array arranges half of apertures 516 in two linear rows extending from near front edge 518 of supporting platform 500 toward rear edge 522 of supporting platform. Each of apertures 516 is formed in any suitable size and shape, but, in one example, are square or rectangular. In one example, each row of the two linear rows of apertures 516 includes seven of apertures 514, although other numbers of apertures 516 are equally acceptable.

Figure 35:
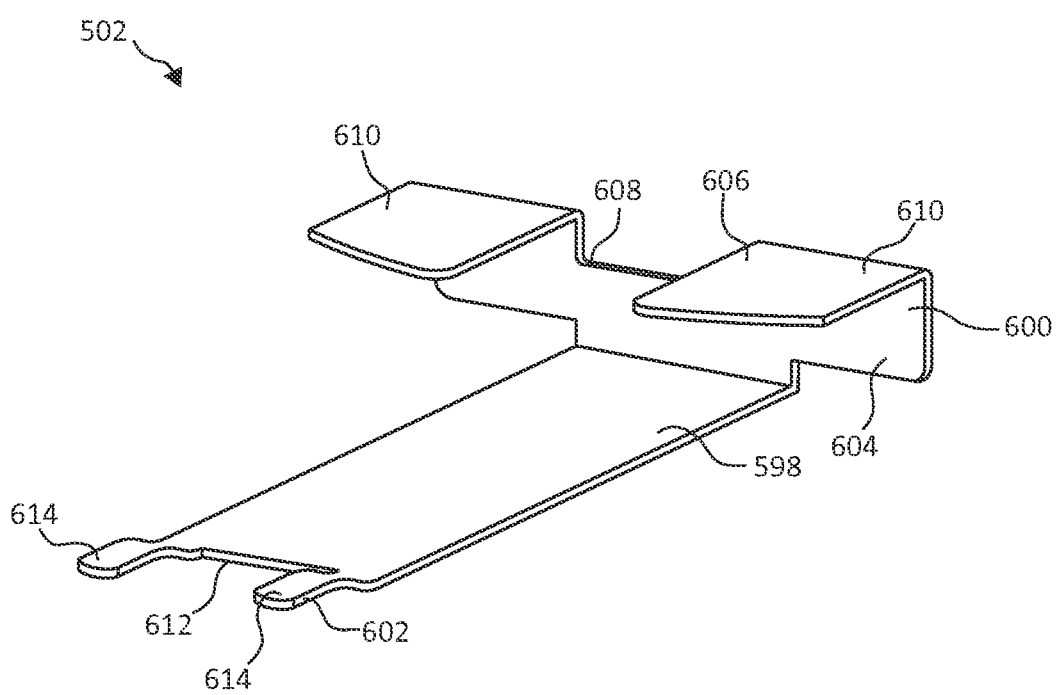
FIG. 35 is a perspective view of an adjustable arm of the mounting fixture of FIG. 26, according to another embodiment of the present invention.

Adjustable arms 502 are each configured to be coupled with supporting platform 500 via apertures 514. Referring to FIG. 35, each arm 502 like side arms 142, top arm 144, and bottom arm 146 of mounting fixture 16 is formed from sheet metal and defines an elongated section 598 and a hooked section 600. Hooked section 600 extends from one end of elongated portion and includes spacer portion 604 and a return portion 606. Spacer portion 604 extends substantially perpendicularly and upwardly with respect to elongated section 598. Return portion 606 extends from spacer portion 604 opposite elongated portion 598 in a direction substantially parallel to elongated portion 598. In one example, spacer portion 598 has a length defined between elongated portion 598 and return portion 602 configured to receive an entire thickness of a front edge 636 of keyboard portion 632 of computing notebook as seen in FIG. 1. In one example, a cutout 608 is formed by and centered laterally in return portion 606 dividing each return portion 606 into two, spaced apart return prongs 610 for interfacing with a top surface of keyboard portion 632 of computing notebook 14.

Figure 36:
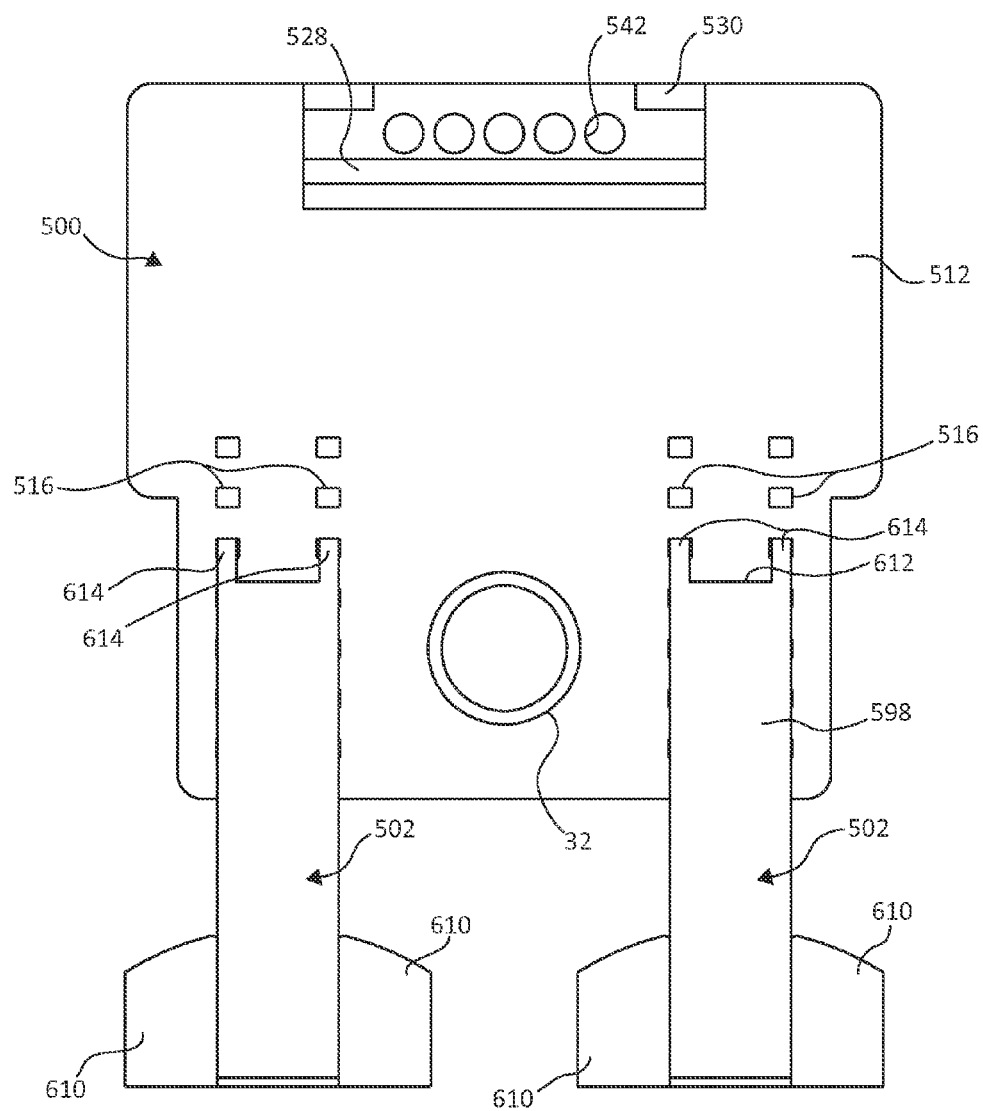
FIG. 36 is a bottom view of a portion of the mounting fixture of FIG. 26 including a mounting platform, the support barrel, and two adjustable arms, according to another embodiment of the present invention.

At the opposite end of elongated section 598, a cutout 612 is formed through and laterally centered relative to that end of elongated section 598 to define two pegs 614 spaced apart a distance substantially identical to a distance each row of an array of two rows of apertures 516 are spaced from one another. In one example, each peg 614 is curved or steps upwardly relative to a remainder of elongated section 598. To couple each arm 502 with supporting platform 500, the two pegs 614 of each arm are placed through apertures 516 in one of the two arrays of apertures 516 in supporting platform 500 as illustrated in the bottom view of FIG. 36. Each arm 502 is adjustable in the distance it extends from rear edge 522 of supporting panel 500 or in the distance it extends from a front of legs 526 of raised bridge 524, as will be described below, by changing which apertures 516 it interfaces with in supporting platform 500.

In one embodiment, supporting platform 500 defines a rear cutout 520 inwardly extending from rear edge 522 thereof. Rear cutout 520 is substantially rectangular or otherwise suitably shaped and is laterally centered on supporting platform 500. A riser member or raised bridge 524 is formed near a rear edge 522 of and coupled to supporting platform 500. More specifically, raised bridge 524 includes two opposing legs 526 and a top-spanning section 528. Each of legs 526 is coupled to supporting platform 500 on an opposite lateral edge of rear cutout 520 adjacent rear edge 522 of supporting platform 500 a suitable distance that is more than a likely thickness of keyboard portion 632 of computing notebook 14 (FIG. 1). Top spanning section 528 extends between legs 526 opposite supporting platform 500. In one embodiment, top-spanning section 528 is split or otherwise includes a hollow central portion for reasons that will become clear upon reading the additional description below.

A support barrel 530 in the general form of a hollow cylindrical tube is placed on top of and supported by top-spanning section 528. Support barrel 530 extends from a first end 532 to a second end 534 and defines end openings 536 at each of first end 532 and second end 534. In one example, each opening 536 is substantially D-shaped and defines a flat side 538 thereof on a front or rear side of support barrel 530. Support barrel 520 additionally defines top apertures 540 and bottom apertures 542. Top apertures 540, in one embodiment, are formed in a linear and laterally extending array formed across a topmost portion of support barrel 520. Bottom apertures 542 are formed in a bottommost portion of support barrel 520 in an array substantially identical to and aligning with the array of top apertures 540. As such, any pin 622, etc. thread through one of top apertures 540 extends through support barrel 520 and through a corresponding one of bottom apertures 542.

Figure 30:
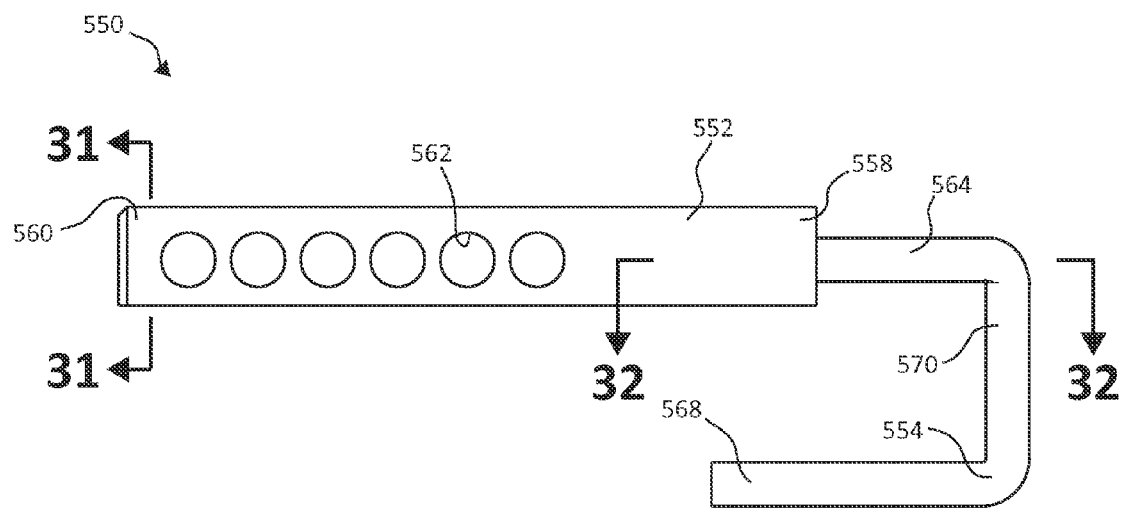
FIG. 30 is top view illustration of a first laterally adjustable arm of the mounting fixture of FIG. 26, according to another embodiment of the present invention.
Figure 31:
FIG. 31 is a cross-sectional view illustration of the first laterally adjustable arm taken along the line 31-31 in FIG. 30, according to another embodiment of the present invention.
Figure 32:
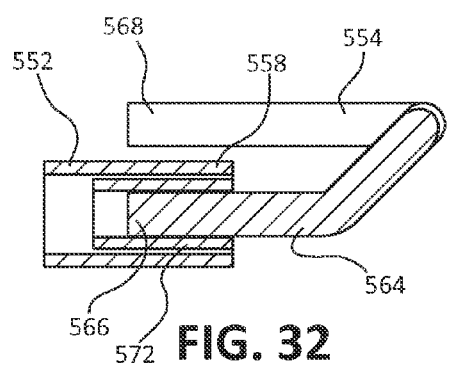
FIG. 32 is a cross-sectional view illustration of the first laterally adjustable arm taken along the line 32-32 in FIG. 30, according to another embodiment of the present invention.

Back screen support 504 of mounting fixture 18 includes raised bridge 524, support barrel 530, a first laterally adjustable retainer or arm 550 and a second laterally adjustable arm 580, according to one embodiment. Referring to FIGS. 30-32, first laterally adjustable arm 550 includes a slide tube 552 and a hook 554. Slide tube 550 is substantially hollow and is substantially D-shaped with a flat side 556. Slide tube 550 defines a first open end 558 and a second open end 560. Apertures 562 sized, shaped, and arranged substantially identically to top apertures 540 and bottom apertures 542 of support barrel 530 are formed through topmost and bottommost portions of slide tube 550.

Hook 554 defines a first end 566 and a second end 568 opposite first end 566. Near first end 566, hook 554 includes a linear section 564 and as it nears second end 568, hook 554 transitions into a C-shaped section of hook 554 is defined and extends from second end 568 In one embodiment, hook 554 is formed of circularly tubular material with bends to in C-shaped hook that both bend hook 554 forward and up and down to more easily accommodate various sized of screen portions 630 of computing notebooks 14 (FIG. 1).

First end 566 of hook 554 is coupled with first open end 558 of slide tube 552. To accommodate the small diameter of hook 554 relative to the relatively large diameter of slide tube 552, in the illustrated embodiment, an adapter tube 572 is used as shown in FIG. 32, for instance. Adapter tube 572 is secured around first end 566 of hook 554 and has an inside diameter substantially equal to an outside diameter of hook 554 and an outside diameter substantially equal to an inside diameter of slide tube 552. As such, adapter tube 572 is then placed in first open end 558 of slide tube 552 and secured thereto. Once hook 554 is secured to slide tube 552 any rotation of one of hook 554 and slide tube 552 causes rotation of the other, in one embodiment.

Figure 26:
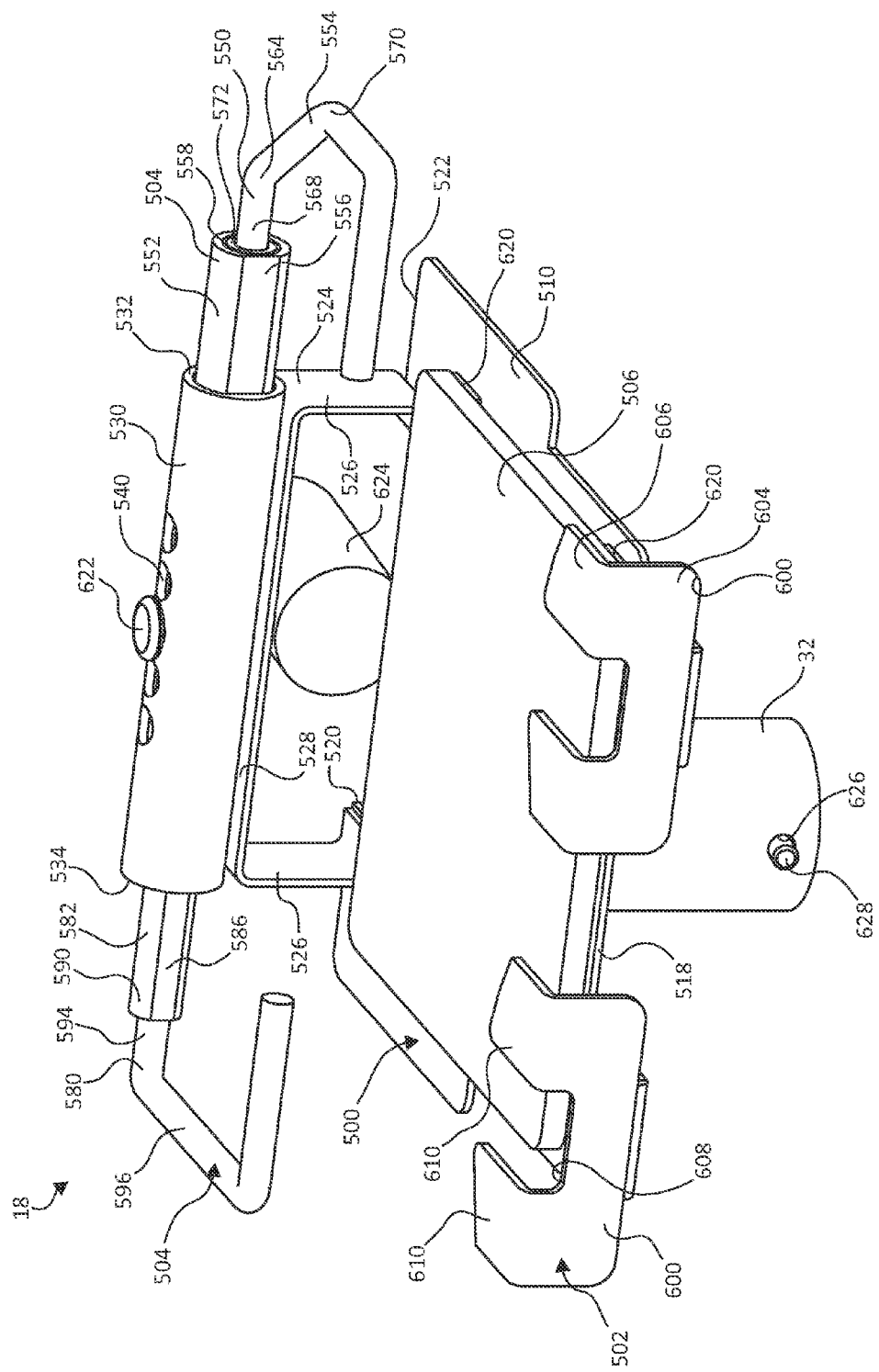
FIG. 26 is a perspective view illustration of a mounting fixture used in the display system of FIG. 1, according to another embodiment of the present invention.

Second laterally adjustable retainer or arm 580 is formed somewhat similar to first laterally adjustable arm 550. More specifically, second laterally adjustable arm 580 includes a slide tube 582 and a hook 584. Slide tube 580 is substantially hollow and is substantially D-shaped with a flat side 586 (FIG. 26). Slide tube 580 defines a first open end 588 and a second open end 590. Apertures 592 sized, shaped, and arranged substantially identically to top apertures 540 and bottom apertures 542 of support barrel 530 are formed through topmost and bottommost portions of slide tube 580.

Hook 584 includes a linear section 594 at one end and transitions into a C-shaped section 596 of hook 584 at an opposing end. In one embodiment, hook 584 is formed of circularly tubular material with bends both forward and up and down to form C-shaped section 596 to more easily accommodate various sized of screen portions 630 of computing notebooks 14 (FIG. 1).

Linear section 594 of hook 584 is coupled with second open end 598 of slide tube 582. In one embodiment, slide tube 582 is sized with a smaller diameter than slide tube 552 while hooks 554 and 584 have similar diameters and, therefore, no adapter tube 572 is used for second laterally adjustable arm 580. Once hook 584 is secured to slide tube 582 any rotation of one of hook 584 and slide tube 582 causes rotation of the other, in one embodiment.

First and second slide tubes 552 and 582 are sized and shaped such that second slide tube 582 fits within first slide tube 582 as generally illustrated in FIG. 34. When so positioned, hooks 554 and 584 extend out of opposing ends of the resultant assembly. The D-shaped nature of slide tubes 552 and 582 generally prevents rotation of the two tubes 552 and 582 relative one another and maintains apertures 562 of slide tube 552 aligned with apertures 592 of slide tube 582. Upon assembly as part of mounting fixture 18, the two slide tubes are assembled to place slide tube 582 in slide tube 552 within support barrel 530 as illustrated in FIGS. 26-28. D-shaped opening 536 allows support barrel 530 to receive tubes 552 and 582 in only a given rotation and does not allow rotation of slide tubes 552 and 582 relative to support barrel 530, which maintains all apertures 540 and 542, 562, and 582 all in position at the topmost and bottommost locations of their respective support barrel 530, slide tube 552, and slide tube 582. Slide tubes 552 and 582 remain slidable linearly toward and away from one another to adjust to different widths of computing notebooks 14 or slide out of support barrel 530 to allow removal of computing notebook from mounting fixture 18.

A pin 622 is provided and configured to extend through both top apertures 540 and bottom apertures 542 (FIG. 36) in support barrel 530 and, therefore, through aligned apertures 562 of slide tube 552 of first laterally adjustable arm 550 and apertures 592 of slide tube 582 of second laterally adjustable arm 580 to maintain first laterally adjustable arm 550 and second laterally adjustable arm 580 in place relative to support barrel 530. In one embodiment, pin 622 is of sufficient length to extend beyond bottom apertures 542 of support barrel 530 such that a lock 624 (FIGS. 26-28) receives a bottom of pin 622 locking the structure in place.

During use, one of a variety of computing notebooks 14 is selected to be displayed in one of mounting fixtures 18. Cords and wiring (not shown) to computing notebook 14 is thread through trunk 32 and aperture 514 in support platform 500. Pad 506 is placed on top surface 510 of support platform 500, and in one embodiment, is both spaced slightly from top surface 510 and removeably coupled thereto with magnetic strips 620 (FIG. 26). Pad 506 cushions computing notebook 14 and, in one example, absorbs heat from computing notebook 14 to decrease heating of support platform 500. Cords extend between pad 506 and top surface 510 of support platform 500 to a rear (not shown) of computing notebook 14.

First or keyboard portion 632 of computing notebook 14 is set on pad 506. Next, arms 502 are each coupled with supporting platform 500 using apertures 516 in supporting platform placing hook sections 600 of each arm 502 as near as possible to a front edge 636 of computing notebook 14 when computing notebook 14 is opened to rotate screen portion 630 away from keyboard portion 632. As such, two prongs 610 each sit just above a top surface of keyboard portion 632. Screen portion 630 is rotated to extending at an angle substantially near perpendicular to keyboard portion 632 and laterally adjustable arms 550 and 580 are slid into support barrel 530 and secured with pin 622 in positions most nearly positioning hooks 554 and 584 to interact with side edges 634 of computing notebook 14, at least positing side edges 634 in C-shaped portions 570 and 596 of hooks 554 and 584. Pin 622 is locked in place with lock 624 to generally prevent or at least decrease theft of displayed computing notebook 14. Finally, cords (not shown) that extend into trunk 32 are thread through a mounting sleeve 28 (FIG. 1) and plugged into a power source and trunk 32 is secured within mounting sleeve 28, for example, via pin 628 and/or other suitable coupling(s). As such, computing notebook 14 can be powered and functional while on display.

The mounting fixtures described therein provide adjustable, secure, and aesthetically pleasing support for computing devices of various types. As described and illustrated, the mounting fixtures include four arms and such arms are adjustable in at least two directions that extend substantially perpendicularly with respect to one another to accommodated various sizes of the corresponding type of computing devices. In this manner the precise inventory of mounting fixtures does not need to be updated for each slightly new form factor computing device, but rather existing mounting fixtures need only have their arm positions adjusted to securely receive the new computing device. This cuts down on the inventory of specific mounting fixture types that must be maintained by a given retail store and is more easily understood by retail store employees installing new mounting fixtures.

Although the invention has been described with respect to particular embodiments, such embodiments are meant for illustrative purposes only and should not be considered to limit the invention. Various alternatives and changes will be apparent to those of ordinary skill in the art upon reading this application. Other modifications within the scope of the invention and its various embodiments will be apparent to those of ordinary skill.

What is claimed is:

1. A mounting fixture for securely displaying a computing device in a retail store, the mounting fixture comprising:
   a box including a primary panel, four sidewalls rearwardly extending from the primary panel, and a central hub rearwardly extending from a rear surface of the primary panel;
   a first arm extending substantially perpendicularly to and beyond an outer surface of one of the four sidewalls, wherein the first arm includes a first elongated slot and has a first hook section at an outermost end thereof configured to receive an outer edge of the computing device, and the first elongated slot extends around and is slidably adjustable in a first direction relative to the central hub of the box to cause the first arm to extend further from or closer to the one of the four sidewalls; and
   a second arm extending substantially perpendicularly to and beyond an outer surface of a second one of the four sidewalls, wherein the second arm includes a second elongated slot and has a second hook section at an outermost end thereof configured to receive a different outer edge of the computing device, wherein the second elongated slot extends around and is slidably adjustable in a second direction relative to the central hub to cause the second arm to extend further from or closer to the second one of the four sidewalls, the second direction being substantially perpendicular to the first direction.

2. The mounting fixture of claim 1, further comprising:
   a third arm extending substantially perpendicularly to and beyond an outer surface of a third one of the four sidewalls opposite the one of the four sidewalls, wherein the third arm includes a third elongated slot and has a third hook section at an outermost end thereof, and the third elongated slot extends around and is slidably adjustable relative to the central hub to cause the third arm to extend further from or closer to the third one of the four sidewalls in the first direction; and
   a fourth arm extending substantially perpendicularly to and beyond an outer surface of a fourth one of the four sidewalls opposite the second one of the four sidewalls, wherein the fourth arm includes a fourth elongated slot and has a fourth hook section at an outermost end thereof, wherein the fourth elongated slot extends around and is slidably adjustable relative to the central hub to cause the fourth arm to extend further from or closer to the fourth one of the four sidewalls in the second direction.

3. The mounting fixture of claim 1, further comprising:
   a tightening device rotatably secured around the central hub opposite the primary panel of the box, wherein the tightening device transitions from a tight position in which the first arm and the second arm are securely held in place relative to the box and a loose position in which the first arm and the second arm are readily linearly adjustable relative to the box, and the tightening device is configured to be locked in the tight position.

4. The mounting fixture of claim 3, wherein:
   the tightening device includes a wing nut with a handle,
   the wing nut is rotatably secured around the central hub,
   the mounting fixture further comprises a locking tab defining a support platform bordered by two opposing stops, the locking tab is radially spaced from the central hub, and
   the locking tab is configured to maintain the tightening device in the tight position when the handle is placed over the support platform between the two opposing stops.

5. The mounting fixture of claim 3, wherein:
   the tightening device includes a rotating disk rotatably secured around the central hub,
   the rotating disk includes an aperture near an outer perimeter thereof,
   the box includes a locking post extending rearwardly from the primary panel, and being radially spaced from the central hub,
   the tightening device further includes a spring biasing the rotating disk toward the primary panel, and
   the aperture of the rotating disk selectively fits over the locking post to maintain the tightening device in the tight position.

6. The mounting fixture of claim 3, wherein:
   the tightening device includes a rotating disk rotatably secured around the central hub,
   the rotating disk includes a protruding post near an outer perimeter thereof, and
   the mounting fixture further comprises a trunk assembly configured to be received in a retail display base and having a slot formed therein for receiving the protruding post to secure the tightening device in the tight position when the box is coupled with the trunk assembly.

7. The mounting fixture of claim 1, further comprising a trunk assembly including:
   a hollow trunk configured to interface with a display base;
   a mounting plate coupled to the hollow trunk and sized to cover a back of the box, wherein the mounting plate is secured to the box in a position covering the back of the box and extending between and contacting each of the four sidewalls to prevent adjustment the first arm and the second arm positioning within the box when the mounting plate is coupled to the box.

8. The mounting fixture of claim 7, wherein a lock secures the mounting plate to the box.

9. The mounting fixture of claim 1, wherein the first hook section of the first arm and the second hook section of the second arm each form substantially planar return prongs configured to extend in front of the computing device to facilitate securement of the computing device to the box.

10. The mounting fixture of claim 9, further comprising a spacer disk coupled to a front surface of the box, the spacer disk being configured to extend different distances from the primary panel as it is rotated relative to the primary panel, and when the computing device is in place, the spacer disk is configured to be rotatably adjusted to tightly interface with a rear surface of the computing device holding the computing device against the substantially planar return prongs of the first hook section and the second hook section.

11. The mounting fixture of claim 10, further comprising a pad coupled to a front surface of the spacer disk for interfacing with the computing device.

12. The mounting fixture of claim 10, wherein the primary panel of the box includes at least one aperture therethrough allowing finger access to the spacer disk from a rear side of the primary panel to rotate the spacer disk to change the distance the spacer disk extends away from the primary panel while a computing device is placed over the spacer disk.

13. The mounting fixture of claim 10, in combination with the computing device, wherein the computing device contacts each of the first arm, the second arm, and the spacer disk to securely hold the computing device relative to the box.

14. The combination of claim 13, further comprising:
a base with a mounting sleeve extending downwardly from a top surface of the base, and
a trunk assembly coupled with the box to cover a rear opening of the box, the trunk assembly including a trunk placed within the mounting sleeve such that the trunk assembly holds the computing device above the top surface of the base.

15. The combination of claim 13, wherein the computing device is a computing tablet.

16. A method of displaying a computing device, the method comprising:
providing a device securement container defining a primary panel and sidewalls rearwardly extending from an outer perimeter of the primary panel;
placing the computing device to extend over the primary panel of the device securement container, the computing device including outer edges, a rear surface, and a front surface opposite the rear surface;
linearly adjusting an elongated appendage member extending from the device securement container to change a distance the elongated appendage member extends from the device securement container such that the elongated appendage member extends around one of the outer edges of the computing device, wherein the elongated appendage member includes a return portion extending in front of the front surface of the computing device;
spinning an adjustment member on a front surface of the primary panel of the device securement container causing the adjustment mechanism to press the computing device toward and tightly against the return portion of the elongated appendage member to securely hold the computing device between the adjustment member and the return portion; and
mounting the device securement container on a trunk assembly extending upwardly from a top surface of a retail display base.

17. A mounting fixture for securely supporting a computing notebook having a keyboard portion and a screen portion hingedly connected thereto, the mounting fixture including:
a support platform for supporting the keyboard portion of the computing notebook;
a support bridge upwardly extending from a rear edge of the support platform;
a hollow support barrel laterally extending across the support bridge and defining a first open end and a second open end opposite the first open end, the hollow support barrel including a plurality of apertures arranged in a line across a topmost portion of the hollow support barrel;
a first retainer including a first slide tube and a first hook extending from a first end of the first slide tube, the first slide tube defining a first line of apertures extending along a topmost portion of the first slide tube, the first line of apertures being sized and positioned substantially identically to the plurality of apertures of the hollow support barrel; and
a second retainer including a second slide tube and a second hook extending from a second end of the second slide tube, the second slide tube defining a second line of apertures extending along a topmost portion of the second slide tube, the second line of apertures being sized and positioned substantially identically to the plurality of apertures of the hollow support barrel and the first line of apertures of the first slide tube;
wherein:
the first slide tube slidably fits within the first open end of the hollow support barrel,
the second slide tube slidably fits within the second open end of the hollow support barrel and into a portion of the first slide tube positioned within the hollow support barrel, and
the first retainer and the second retainer are linearly slidable relative to the hollow support barrel and one another to position the first hook and the second hook to fit snugly around opposing edges of the screen portion of the computing device and to align at least one of the apertures of the hollow support barrel with at least one of the first line of apertures of the first slide tube and at least one of the second line of apertures of the second slide tube.

18. The mounting fixture of claim 17, further comprising a pin extending through each of the at least one of the apertures of the support barrel, the at least one of the first line of apertures of the first slide tube, and the at least one of the second line of apertures of the second slide tube to maintain the first slide tube and the second slide tube in place relative to the support barrel.

19. The mounting fixture of claim 17, wherein each of the first open end, the second open end, the first slide tube, and the second slide tube are substantially D-shaped and define a flat side positioned such that the apertures of the support barrel, the first line of apertures, and the second line of aperture all remain at topmost portions of the respective support barrel, the first slide tube, and the second slide tube.

20. The mounting fixture of claim 17, wherein the support platform defines a two-line array of apertures near a front edge of the support platform, and the mounting fixture further comprises an adjustable appendage having two pegs each configured to selectively fit within an aperture in a different line of the two-line array of apertures to couple the adjustable appendage to the support platform, and an end of the adjustable appendage opposite the two pegs defines a hook section for receiving an front edge of the keyboard portion of the computing notebook.

21. The mounting fixture of claim 17, further comprising a pad magnetically coupled with a top of the support platform, wherein the keyboard portion of the computing device is configured to rest on the pad.

22. The mounting fixture of claim 18, further comprising a lock coupled with the pin to secure the pin in place extending through each of the at least one of the apertures of the support barrel, the at least one of the first line of apertures of the first slide tube, and the at least one of the second line of apertures of the second slide tube to maintain the first retainer and the second retainer in place relative to the support barrel to substantially prevent undesired movement of the computing notebook from the support platform.

23. The mounting fixture of claim 17, further comprising a trunk extending downwardly from the support platform, the trunk being configured to fit within a mounting sleeve of a retail display base.

24. The mounting fixture of claim 23, in combination with the retail display base defining the mounting sleeve, the trunk being placed within and coupled to the mounting sleeve.

25. The combination of claim 24, further comprising the computing notebook wherein the keyboard portion of the computing notebook is supported on the support platform, and the screen portion of the computing notebook is securely positioned between the first hook and the second hook.

26. A display system for displaying a computing device and a computing notebook in a retail store, the computing notebook having a keyboard portion and a screen portion hingedly connected thereto, the display system comprising:
- a base defining a top surface and a plurality of mounting sleeves extending downwardly from the top surface;
- a first mounting fixture for securely supporting the computing device, the first mounting fixture including:
  - a box including a primary panel, four sidewalls rearwardly extending from the primary panel, and a central hub rearwardly extending from a rear surface of the primary panel,
  - a first arm extending substantially perpendicularly to and beyond an outer surface of one of the four sidewalls, wherein the first arm includes a first elongated slot and has a first hook section at an outermost end thereof configured to receive an outer edge of the computing device, and the first elongated slot extends around and is slidably adjustable in a first direction relative to the central hub of the box to cause the first arm to extend further from or closer to the one of the four sidewalls, and
  - a second arm extending substantially perpendicularly to and beyond an outer surface of a second one of the four sidewalls, wherein the second arm includes a second elongated slot and has a second hook section at an outermost end thereof configured to receive a different outer edge of the computing device, wherein the second elongated slot extends around and is slidably adjustable in a second direction relative to the central hub to cause the second arm to extend further from or closer to the second one of the four sidewalls, the second direction being substantially perpendicular to the first direction; and
- a second mounting fixture for securely supporting the computing notebook, the second mounting fixture including:
  - a support platform for supporting the keyboard portion of the computing notebook,
  - a support bridge upwardly extending from a rear edge of the support platform,
  - a hollow support barrel laterally extending across the support bridge and defining a first open end and a second open end opposite the first open end, the hollow support barrel including a plurality of apertures arranged in a line across a topmost portion of the support barrel,
  - a first retainer including a first slide tube and a first hook extending from a first end of the first slide tube, the first slide tube defining a first line of apertures extending along a topmost portion of the first slide tube, the first line of apertures being sized and positioned substantially identically to the plurality of apertures of the support barrel, and
  - a second retainer including a second slide tube and a second hook extending from a second end of the second slide tube, the second slide tube defining a second line of apertures extending along a topmost portion of the second slide tube, the second line of apertures being sized and positioned substantially identically to the plurality of apertures of the support barrel and the first line of apertures of the first slide tube, wherein:
- the first slide tube slidably fits within the first open end of the support barrel,
- the second slide tube slidably fits within the second open end of the support barrel and into a portion of the first slide tube positioned within the support barrel, and
- the first retainer and the second retainer are linearly slidable relative to the support barrel and one another to position the first hook and the second hook to fit snugly around opposing edges of the screen portion of the computing device and to align at least one of the apertures of the support barrel with at least one of the first line of apertures of the first slide tube and at least one of the second line of apertures of the second slide tube.

* * * * *